(12) United States Patent
Koitabashi et al.

(10) Patent No.: US 6,527,385 B2
(45) Date of Patent: Mar. 4, 2003

(54) METHOD FOR INK-JET PRINTING

(75) Inventors: Noribumi Koitabashi, Yokohama (JP); Hitoshi Tsuboi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/801,757

(22) Filed: Mar. 9, 2001

(65) Prior Publication Data

US 2001/0033318 A1 Oct. 25, 2001

(30) Foreign Application Priority Data

Mar. 10, 2000 (JP) ........................... 2000-067451

(51) Int. Cl.$^7$ .................................................. B41J 2/01
(52) U.S. Cl. ........................ 347/101; 347/100; 347/96
(58) Field of Search ........................... 347/96, 100, 101, 347/95, 98

(56) References Cited

U.S. PATENT DOCUMENTS

| | | | |
|---|---|---|---|
| 5,618,338 A | * | 4/1997 | Kurabayashi et al. ........ 347/100 |
| 5,938,827 A | * | 8/1999 | Breton et al. ............. 106/31.43 |
| 6,074,052 A | | 6/2000 | Inui et al. .................... 347/101 |

FOREIGN PATENT DOCUMENTS

| | | | |
|---|---|---|---|
| EP | 0 761 783 A2 | 3/1997 | |
| EP | 0 791 473 A2 | 8/1997 | |
| WO | WO-96/18696 | * 6/1996 | ........... C09D/11/02 |

* cited by examiner

Primary Examiner—John Barlow
Assistant Examiner—Manish S Shah
(74) Attorney, Agent, or Firm—Fitzpatrick, Cella, Harper & Scinto

(57) ABSTRACT

An ink-jet printing process which includes the steps of applying one or two inks on a recording medium, and applying a treating liquid reactive with the ink prior to the ink application, wherein the ink contains a first pigment and a second pigment dispersed in an aqueous medium, or two inks each contains the first pigment and the second pigment respectively, wherein the first pigment is a self-dispersing pigment having anionic groups or cationic groups bonded directly or through another atomic group to the surface of the pigment; and the second pigment can be dispersed in an aqueous medium by a polymer dispersant, the ink further contains a dispersant for disperse the second ink where the dispersant is a nonionic dispersant or a dispersant having the same polarity as that of the group bonded to the surface of the first pigment, and the treating liquid.

25 Claims, 9 Drawing Sheets

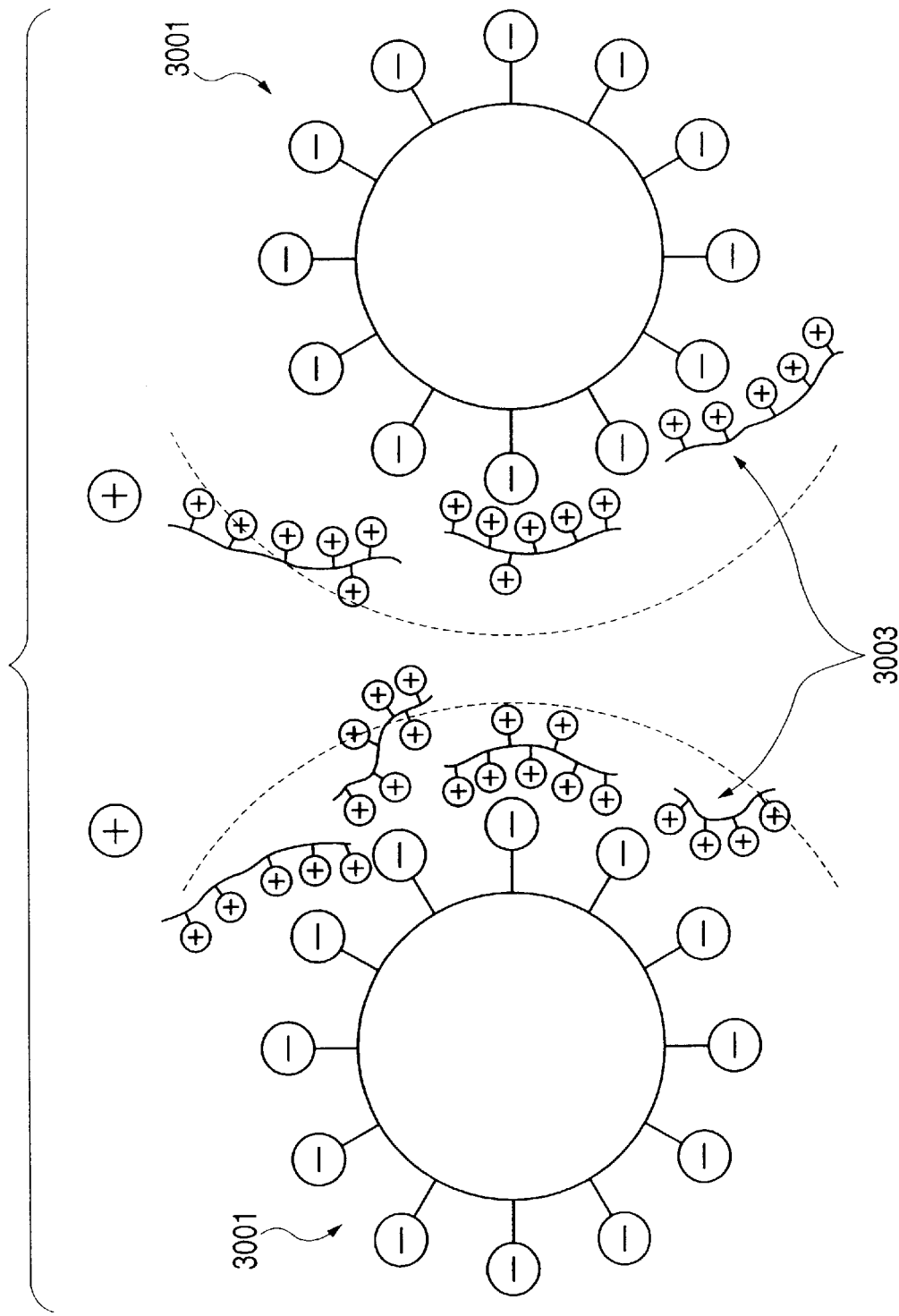

METHOD FOR INK-JET PRINTING

BACKGROUND OF THE INVENTION

1. Field of the Invention

The present invention relates to an ink-jet printing method, more specifically, relates to an ink-jet printing method for carrying out printing of characters, images, or the like on a recording medium such as printing paper, OHP paper using an ink and a liquid which makes a coloring material in the ink insoluble (hereafter referred to as a treating liquid).

2. Related Background Art

The ink-jet printing method has various advantages including low noise operation, low running cost, high-speed printing, and easy adaptation for down-sizing and for color printing. Thus, ink-jet printing is widely employed for printers, copying machines, or the like. In general, the ink employed for printers is selected in consideration of its printing properties such as ejecting properties and fixing properties and print qualities such as bleeding, optical reflection density, and coloring of the printed images. As is well known, inks are divided into two types according to the coloring material contained in the ink, i.e., the dye ink and the pigment ink.

The pigment ink has various advantages in comparison with the dye ink, such as superior water resistance and light fastness, and clear character printing. On the other hand, in comparison with the dye-based ink, it takes time to fix the pigment-based ink on a recording medium, the rub-off resistance of the fixed images is not sufficient sometimes, and the size of the ink dot formed on the recording medium by one ejection from the nozzle tends to be small. That is, the pigment in a pigment ink is generally stably dispersed in the ink by the electric repulsion force of the polymer dispersant which destroys the agglomeration of the pigment particles due to intermolecular force. Therefore, it is preferable to add a polymer dispersant to an ink in an amount according to the amount of the pigment. When such a pigment-based ink is applied onto a recording medium such as plain paper by an ink-jet recording process for printing characters, the solvent, e.g. water, of the ink penetrates into the paper and evaporates into the ambient air, and the pigment particles agglomerate. At that time, the more a polymer dispersant is added, the stronger the agglomeration force of the ink on the paper becomes. Thus, when an ink dot is formed on a paper sheet with a prescribed volume of the ink ejected from an ink-jet head, the diameter of the dot is small and the dot shape remains irregular due to the impact of landing on the paper. Therefore, in order to obtain an ink dot having a sufficient recording density and a diameter necessary for forming a recording image without white stripes or other similar defects, the ejection volume of an ink from an ink jet head must be adjusted rather high. Even with such an adjustment, the presence of a polymer dispersant in a pigment ink, in combination with the penetrability decrease of the ink due to the strong agglomeration force of the pigment particles adsorbed on the dispersant, may delay the fixation of a pigment ink on a recording medium or lower the rub-off resistance of the recorded image.

In order to make the dot diameter larger and to improve the fixation properties, a penetrant may be added to a pigment ink to enhance penetration of the ink into a recording medium. However, use of a penetrant may cause undesirable phenomena such as the irregular peripheral shape of the dot (feathering), and penetration of the ink to the back of the recording medium (back-through), which are undesirable for the high quality recorded image. Further, since the coloring material penetrates into the recording medium, it often occurs that the optical density (OD) of the ink dot is not so much increased as the dot diameter increases. In business use application of the ink-jet printers, which will be developed intensively, more improvement will be required in printing speed. In that case, insufficient fixation of the ink onto the recording medium may cause following phenomena: when printed recording medium such as paper sheets are continuously output from the ink-jet printer to be piled one after another, the image on a paper sheet may be disturbed or the set off of the image may occur.

To solve such problems, inks containing a self-dispersing pigment have been proposed. Such an ink can provide dots of a larger diameter, since the pigment agglomeration force on the paper is weaker than that in conventional pigment inks in which the pigment is dispersed by a dispersant. It, however, is not sufficient yet.

As mentioned above, there are still much room for study and development in the printing method to satisfy various factors determining the quality of printing such as fixability of the ink, enlargement of the ink dot diameter, uniform density in an ink dot, and high optical density of the ink itself.

Meanwhile, in order to further improve printing quality by the ink-jet printing process such as water fastness and optical density of the print on a recording medium, there has been proposed and practically used a method to provide onto a recording medium an ink and a treating liquid which is reactive with the ink so as to make them react on the recording medium.

In purpose of solving the above-mentioned problems of the pigment ink but still maintaining the advantages of the pigment ink, the inventors of the present invention have been studying the above-mentioned ink-jet printing technology using a pigment-based ink and a treating liquid which breaks the pigment dispersion state of the ink by reaction. As a part of the study, the inventors have carried out a recording process, in which a pigment ink is applied after a treating liquid was applied onto the recording medium so as to be mixed with the pigment ink in a liquid state. The quality of the resultant image was not necessarily satisfactory and in some cases the quality was rather inferior to that formed using the pigment ink only. Specifically, when a pigment ink containing a pigment dispersed in an aqueous medium by a polymer dispersant was used in combination with a treating liquid reactive with the pigment ink, sometimes OD reduction due to the low area factor of the obtained ink dot was observed. The reason why such a phenomenon occurs is not clear, but probably because the agglomeration of the pigment of the ink on the recording medium is promoted to a large extent by the treating liquid. Thus, to increase the optical density, the area factor may be increased by increasing the amount of the ink ejection, but sometimes leading to the inferior fixability. Also, when a combination of a pigment ink containing a self-dispersing pigment and a treating liquid reactive with the ink is used, a phenomenon called "oozing" or "haze" is sometimes observed at the peripheral part of the ink dot formed on a recording medium interfering with clear dot formation. FIG. 1 is a schematic plan view of a dot to which this oozing or haze phenomenon has occurred, where a haze part 7 is present due to the oozing around a reaction area of a pigment ink 7 and a treating liquid 6. FIGS. 2A, 2B, and 2C illustrate the assumed mechanism of occurrence of this phenomenon.

When a treating liquid S is applied to a recording medium P (especially plain paper) (FIG. 2A) and then a pigment ink $I_p$ containing a self-dispersing pigment but not containing a polymer dispersant (hereinafter referred to as "dispersant-free pigment ink") is applied thereon as shown in FIG. 2B, a reaction product 9 starts to be formed. As the reaction proceeds, radial "oozing" occurs from an approximately circular dot of the reaction product as illustrated in FIG. 2C surrounding the dot with "haze". Such "oozing" or "haze" is recognized as the same as the known feathering in appearance, deteriorating the printing quality.

Above described "oozing" or "haze" is assumed to be a chemical reaction or, in a micro-scale, a following phenomenon. A dispersant-free pigment ink reacts with the treating liquid at a relatively high reaction rate, so that immediately the dispersion break down of the dispersed pigment occurs to produce clusters of the reaction product. At the same time, fine particles of the reaction product are also produced, which then flows out into the recording medium with the penetrating treating liquid to cause "oozing" or "haze".

As described above, mere combination of a pigment ink and a treating liquid would cause unexpected phenomena, making it difficult to obtain high quality ink-jet recording images. The inventors has recognized the necessity of the further technical development of an ink-jet recording technology utilizing a treating liquid, overcoming the disadvantages and retaining the advantages of the pigment ink.

Considering the application of the ink-jet printers to the business use, more improvement will be required in printing speed. One of the great technical problems of such high speed printers is the fixability of the ink onto the recording medium. If the fixability is not good, when printed recording media such as paper sheets are continuously output from an ink-jet printer to be piled one after another, the printed image on a paper sheet may be smeared or the setoff of the image may occur deteriorating printing quality or spoiling the appearance of the printed matter.

SUMMARY OF THE INVENTION

The present invention is achieved in consideration of the foregoing newly obtained technical knowledge and findings. An object of the present invention is to provide an ink-jet printing method for obtaining a high quality print, using a treating liquid and a pigment ink in ink-jet printing.

Another object of the present invention is to provide an ink-jet printing method which enables rapid ink fixation to a recording medium without spoiling the quality of the printed matter.

According to one embodiment of the present invention, there is provided an ink-jet printing process including a process of recording images on a recording medium, said process comprising the steps of:

(i) applying an ink on a recording medium by employing an ink-jet recording process, and (ii) applying a treating liquid capable of reacting with the ink;

wherein said ink contains a first pigment and a second pigment dispersed in an aqueous medium, said first pigment being selected from a self-dispersing pigment having at least one anionic group bonded directly or through another atomic group to the surface of the first pigment and a self-dispersing pigment having at least one cationic group bonded directly or through another atomic group to the surface of the first pigment and said second pigment being capable of being dispersed in an aqueous medium by a polymer dispersant, said ink further containing at least one dispersant selected from the group consisting of polymer dispersants having the same polarity as that of the group bonded to the surface of said first pigment and nonionic polymer dispersants, and wherein said step (i) is conducted subsequently to said step (ii) so as to bring said ink and said treating liquid into contact with each other in a liquid state on said recording medium.

According to another embodiment of the present invention, there is provided an ink-jet printing process comprising the steps of:

(i) applying a first ink, (ii) applying a second ink, and (iii) applying a treating liquid reactive with each of said first and second inks in such a manner that the respective first ink, second ink and treating liquid come into contact with on the surface of a recording medium in a liquid state, wherein said first ink contains a first pigment selected from a self-dispersing pigment having at least one anionic group bonded directly or through another atomic group to the surface of said first pigment and a self-dispersing pigment having at least one cationic group bonded directly or through another atomic group to the surface of the first pigment, said second ink contains a dispersant and a second pigment capable of being dispersed in an aqueous medium by the polymer dispersant, the dispersant being at least one selected from a nonionic polymer dispersant and a polymer dispersant having the same polarity as that of the group bonded to the surface of the self-dispersing pigment, said treating liquid containing a compound having a polarity opposite to the group bonded to the surface of the self-dispersing pigment, and the step (iii) is carried out before the steps (i) and (ii).

By the invention according to respective embodiments as described, high quality images of high OD and high edge sharpness can be obtained and various advantages such as rub-off resistance and enhanced fixability can be obtained.

The reason why such effects can be achieved by the these embodiments is not clear. The inventors, however, have done various experiments to observe following facts.

When an ink containing a first pigment and a second pigment is applied to a region of a recording medium where a treating liquid have been applied to overlap or contact the treating liquid in a liquid state, the ink spreads into the region to form an ink dot of a large diameter.

When the second pigment and the treating liquid reacts, the agglomeration force will be too strong to form a dot of a large diameter. Therefore, the coexistence of the first and the second pigments at the reaction with the treating liquid may moderate the agglomeration between the polymer dispersant and the treating liquid, that is, it is considered that the reaction between the first pigment and the reacting component in the treating liquid may moderate the strong entwining phenomenon between the reactive component (e.g. a polymer compound) in the treating liquid and a polymer dispersant in the ink, and further the strong intermolecular force between the second pigment molecules may be moderated by the presence of the first pigment, which allows horizontal diffusion of the ink.

On the contrary, it is considered that the haze phenomenon observed during the reaction between the treating liquid and the first pigment may be alleviated by the reaction between the polymer compound in the treating liquid and the second pigment, or by the enclosure of the fine particles causing the haze by the reaction product. As a result, in spite of the larger dot diameter, haze phenomenon hardly occurs to provide excellent edge sharpness.

Further, since an ink dot of a larger diameter can be formed with a smaller ink amount as described above, better fixability can be obtained. The fixability is improved in combination with the use of the first pigment which can reduce the amount of the polymer dispersant to be added to the ink.

For the embodiments of the present invention, by using a treating liquid having a higher penetrability to the recording medium, the fixability and the dot diameter are further improved. Probably, the treating liquid having a high penetrability to the recording medium diffuses rapidly to form a kind of an ink-receiving layer on the surface of the recording medium, so that the ink can easily penetrate and diffuse on the surface to form a dot reacting with the treating liquid. This is considered to be the reason why a large dot is formed in a short time.

Further, in the embodiments, it is preferable to use a treating liquid of optimized components according to the types and ratio of the first and second pigments in the ink, in order to further improve the image quality. That is, a self-dispersing pigment probably has a prickly shape having a large number of whisker-like polar groups (anionic groups) around the pigment core as illustrated as 3001 in FIG. 3A. On the other hand, a polymer compound, for example, polyallylamine (PAA) having a large number of cationic groups in one molecule is generally as illustrated as 3003 in FIG. 3B. When such a compound is mixed with a self-dispersing pigment, as illustrated in FIG. 4, a PAA polymer 3003 entwines itself around a molecule of the self-dispersing pigment 3001. Since not every cationic group of PAA, however, can make a match with an anionic group, the reaction product of the self-dispersing pigment and PAA may remain cationic as a whole. Thus, reaction products between the fine pigment particles and PAA have weaker intermolecular force, and are liable to electrically repulse each other, hardly forming a large aggregate. Consequently, these fine particles are considered to cause slight bleeding like haze around the dot. On the other hand, in case of a second pigment dispersed by a polymer dispersant, the dispersing ability of the polymer dispersant having a large number of anionic groups or cationic groups by itself is not completely destroyed by a treating liquid containing a compound having one anionic or cationic group per molecule. Hence, by employing a treating liquid containing both a cationic polymer compound such as PAA and a cationic low molecular weight compound such as benzalkonium chloride 3005 in a prescribed ratio and an ink containing a first pigment having an anionic group on the surface and a second pigment dispersed by an anionic polymer dispersant, the dispersability of the respective pigments in the ink is destroyed on a recording medium without fail to suppress the generation of unreacted cationic groups which will cause the haze phenomenon. As a result, high quality images having high density, no haze and excellent fixation can be formed on a recording medium in a short fixation time.

BRIEF DESCRIPTION OF THE DRAWINGS

FIG. 4 is a notional illustration to show the reaction which occurs in a boundary of two anionic self-dispersing pigments mediated by cationic polymer molecules.

DETAILED DESCRIPTION OF THE PREFERRED EMBODIMENTS

[Embodiment 1–1]

Figure 1:
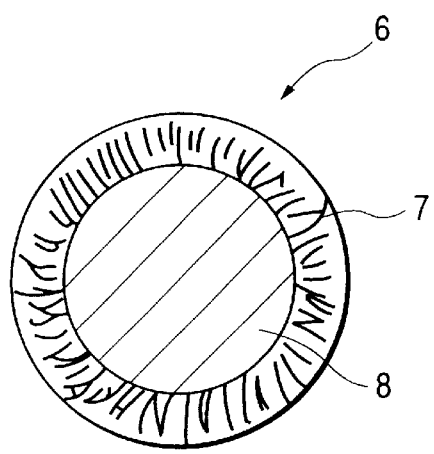
FIG. 1 is a notional illustration describing an "oozing" phenomenon of a reaction product of a pigment ink and a treating liquid.
Figure 2A:
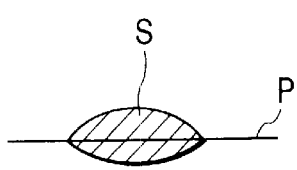
FIGS. 2A, 2B and 2C are notional illustrations describing the dot formation when an ink is applied to a recording medium after the application of a treating liquid according to one embodiment of the invention.
Figure 2B:
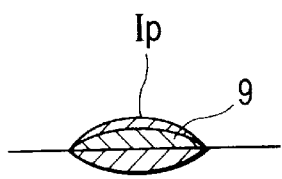
Figure 2C:
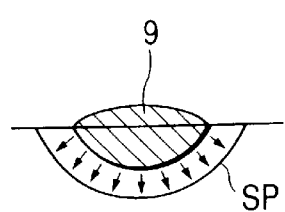

The ink-jet recording process according to one embodiment of the present invention comprises an image dot forming process which comprises the steps of providing an ink containing a first and a second pigments and a treating liquid reactive with the ink, applying the treating liquid and then the ink to a recording medium so that the ink and the treating liquid come into contact to react with each other in a liquid state on the recording medium.

[Ink]

An ink applicable to the embodiment described above includes, for example, one which contains a first and a second pigments as a coloring material dispersed in an aqueous medium where the first pigment is a self-dispersing pigment having at least one anionic group bonded directly or via another atomic group to the surface of the pigment or a self-dispersing pigment having at least one cationic group bonded directly or via another atomic group to the surface of the pigment, the second pigment is a pigment dispersible in the aqueous medium with the aid of a polymer dispersant, and the ink contains at least one polymer dispersant having the same polarity as that of the first pigment or being nonionic to disperse the second pigment.

This ink will be described in order below.

[First Pigment]

The term "self-dispersing pigment" used herein refers to a pigment which can be stably dispersed in an aqueous medium such as water, a water-soluble organic solvent and a mixture thereof without using a dispersant, not forming pigment aggregates which interfere with the normal ink ejection from the orifice in the ink-jet recording.

[Anionic Self-dispersing Carbon Black]

As such a pigment as described above, those having at least one anionic group bonded on their surface directly or via an atomic group are suitably used. The specific examples of such a pigment include carbon black having at least one anionic group bonded to its surface directly or via an atomic group.

The anionic groups bonded to the surface of the carbon black include, for example, —COOM, —SO₃M, —PO₃HM and —PO₃M₂ (wherein M represents a hydrogen atom, alkaline metal, ammonium or organic ammonium.

The alkaline metals represented by "M" described above include, for example, lithium, sodium and potassium, and the organic ammoniums of "M" include, for example, mono-, di-, and tri-methylammonium, mono-, di-, and tri-ethylammonium and mono-, di-, and tri-methanolammonium.

Of the anionic groups described above, —COOM and —SO₃M are particularly preferable because a highly stable carbon black dispersion state can be obtained.

It is preferable to use the various anionic groups described above by bonding them to the surface of carbon black via an atomic group. As such an atomic group, there are, for example, a linear or branched alkylene group having 1 to 12 carbon atoms, a substituted or unsubstituted phenylene group, or a substituted or unsubstituted naphthylene group. The substituent groups for the phenylene group or naphthylene group include, for example, a linear or branched alkyl group having 1 to 6 carbon atoms.

Specific examples of anionic groups bonded to the surface of carbon black via an atomic group include, for example, —C₂H₄COOM, —PhSO₃M and —PhCOOM where Ph represents a phenyl group. However, it is to be understood that the present invention is not intended to be limited to the specific examples.

Carbon black having the above-described anionic group bonded to its surface directly or via an atomic group can be produced, for example, as follows.

A —COONa group can be introduced onto the surface of carbon black, for example, by subjecting the commercially available carbon black to oxidative treatment with sodium hypochlorite.

An —Ar—COONa group (wherein Ar represents an aryl group) can be introduced onto the surface of carbon black by treating an NH₂—Ar—COONa group with nitrous acid, and bonding the formed diazonium salt onto the surface of carbon black. However, the present invention is not limited to these specific examples.

[Cationic Self-dispersing Carbon Black]
[Cationically Charged Carbon Black]

Cationically charged carbon black includes, for example, one having on the surface thereof at least one quaternary ammonium group selected from the following group:

Quaternary ammonium groups:

—NH₃⁺, —NR₃⁺, —SO₂NH₂, —SO₂NHCOR

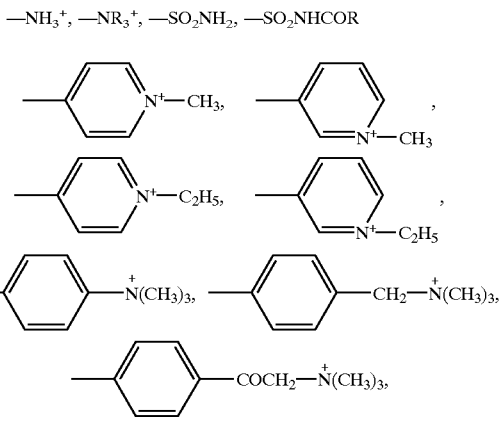

-continued

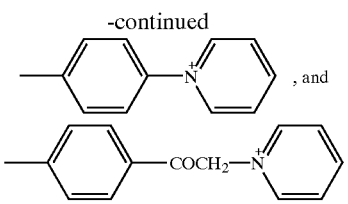

wherein R represents a linear or branched alkyl group having 1 to 12 carbon atoms, a substituted or unsubstituted phenyl group, or a substituted or unsubstituted naphthyl group. The substituent groups for the phenyl group or the naphthyl group include, for example, a linear or branched alkyl group having 1 to 6 carbon atoms.

As an example of a method for producing the self-dispersing carbon black cationically charged by bonding such a hydrophilic group as described above, is to introduce, for example, an N-ethylpyridyl group of the structure

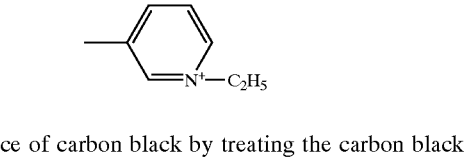

to the surface of carbon black by treating the carbon black with 3-amino-N-ethylpyridinium bromide.

The self-dispersing carbon black cationically charged by introducing a hydrophilic group to the surface of carbon black in this manner keeps a stably dispersed state even when it is contained in a water-based ink without adding any dispersant or the like, since it has good dispersibility in water by virtue of repulsion of the ion thereof.

When cationic groups are bonded to the pigment, they may be directly bonded or indirectly bonded via an atomic group onto the pigment surface. The same atomic groups described for the anionic groups can be used for indirect bonding.

With the self-dispersing pigment particles contained in the ink according to this embodiment, at least 80% of them are preferably of a size of 0.05 to 0.3 μm in diameter, more preferably 0.1 to 0.25 μm. How to prepare such an ink is described in detail in the following Examples.

[Second Pigment]

The second pigment applicable to the ink according to this embodiment includes those dispersible by an action of a polymer dispersant in a dispersion medium of the ink, specifically, in an aqueous medium. This means that such a pigment can be stably dispersed in an aqueous medium only when the pigment particles have adsorbed the molecules of a polymer dispersant on the surface. As such pigments, there are, for example, carbon black pigments such as furnace black, lamp black, acetylene black and channel black. The specific examples of such carbon black pigments are described below, and each of the carbon black pigments can be used solely or in proper combination.

Carbon black pigments:

Raven 7000, Raven 5750, Raven 5250, Raven 5000 ULTRA, Raven 3500, Raven 2000, Raven 1500, Raven 1250, Raven 1200, Raven 1190 ULTRA—II, Raven 1170 and Raven 1255 (available from Columbia Co., Ltd.)

Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Valcan XC-72R (available from Cabot Co., Ltd.)

Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (available from Degussa Co., Ltd.)

No. 25, No. 33, No. 40, No. 47, No. 52, No. 900, No. 2300, MCF-88, MA 600, MA 7, MA 8, MA 100 (available from Mitsubishi Chemical Industries Ltd.)

The other black pigments include, for example, fine particles of magnetic materials such as magnetite and ferrite and titanium black.

In addition to the black pigments described above, blue pigments and red pigments can also be used.

The amount of coloring materials, which is the sum of the first and the second pigments, preferably ranges from 0.1 to 15% by weight of the ink weight, more preferably 1 to 10% by weight. The ratio of the first pigment to the second pigment is preferably in the range of 5/95 to 97/3 by weight, more preferably 10/90 to 95/5 by weight. Further more preferably, the first pigment/the second pigment ratio=9/1 to 4/6. More preferably, the amount of the first pigment is larger than that of the second pigment. When the amount of the first pigment is larger than that of the second pigment, it is obtained not only the dispersion stability, but also the ejection stability including ejection efficiency and reliability attributable to the less wetting of the surface of the ink-ejecting orifice.

Further, an ink containing a lesser amount of the second pigment on which a polymer dispersant is adsorbed will spread on the surface of paper so as to presumably form a uniform thin film of the polymer dispersant on the paper, thus enhancing the rub-off resistance of the formed image.

As a polymer dispersant for uniformly dispersing the second pigment in an aqueous medium, it is suitable to use those function to disperse the pigment in an aqueous medium when adsorbed on the surface of the pigment. Such polymer dispersants include anionic, cationic and nonionic polymer dispersants.

[Anionic Polymer Dispersant]

Anionic polymer dispersants include, for example, polymers consisting of a hydrophilic monomer and a hydrophobic monomer, and salts of such polymers. The specific examples of hydrophilic monomers include, for example, styrene sulfonic acid, $\alpha,\beta$-ethylenically unsaturated carboxylic acid, derivatives of $\alpha,\beta$-ethylenically unsaturated carboxylic acid, acrylic acid, derivatives of acrylic acid, methacrylic acid, derivatives of methacrylic acid, maleic acid, derivatives of maleic acid, itaconic acid, derivatives of itaconic acid, fumaric acid and derivatives of fumaric acid.

The specific examples of hydrophobic monomers include, for example, styrene, styrene derivatives, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkylesters of acrylic acid and alkylesters of methacrylic acid.

The specific examples of the salt used herein include, for example, alkali metal salts and onium compounds of ammonium ion, organic ammonium ion, phosphonium ion, sulfonium ion, oxonium ion, stibonium ion, stannonium ion and iodonium ion; however, the present invention is not limited to the specific examples. To the above-described polymers and the salt thereof, poly(oxyethylene) group, hydroxyl group, acrylamide, derivatives of acrylamide, (dimethylamino)ethylmethacrylate, ethoxyethyl methacrylate, butoxyethyl methacrylate, ethoxytriethylene methacrylate, methoxypolyethyleneglycol methacrylate, vinylpyrrolidone, vinylpyridine, vinyl alcohol and alkylether may be appropriately added.

[Cationic Polymer Dispersant]

As a cationic polymer dispersant, copolymers of a tertiary amine monomer or quaternarized amine monomer and a hydrophobic monomer may be used. For example, N, N-(dimethylamino)ethylmethacrylate, and N, N-dimethyacrylamide can be used as the tertiary amine monomer. As the hydrophobic monomer, for example, styrene, derivatives of styrene and vinylnaphthalene can be used. When a tertiary amine monomer is used, compounds such as sulfuric acid, acetic acid and nitric acid can be used to form a salt. Monomers quaternalized by methyl chloride, dimethylsulfuric acid or the like can be also used.

[Nonionic Polymer Dispersant]

Nonionic polymer dispersants, for example, poly (vinylpyrrolidone), polypropylene glycol and vinylpyrrolidone-vinyl acetate copolymer, can be used.

The above-described first and second pigments and polymer dispersants are appropriately selected in an appropriate combination, and dispersed or dissolved in an aqueous medium, so as to obtain the ink of this embodiment. When the first pigment is a self-dispersing pigment having at least one anionic group bonded onto its surface directly or via an atomic group, the use of at least one polymer dispersant selected from the group consisting of anionic polymer dispersants and nonionic polymer dispersants is preferable in view of the ink stability. When the first pigment is a self-dispersing pigment having at least one cationic group bonded onto its surface directly or via an atomic group, the use of at least one polymer dispersant selected from the group consisting of cationic polymer dispersants and nonionic polymer dispersants is preferable by the same reason.

The ratio of the second pigment to the polymer dispersant used for dispersing the second pigment in an ink is preferably 5:0.5 to 5:2 by weight; however, the present invention is not limited to the specific examples.

[Aqueous Medium]

As an aqueous medium to disperse the first and the second pigments, following water-soluble organic solvents can be used. The water-soluble organic solvents include, for example, alkyl alcohols having 1 to 5 carbon atoms such as methyl alcohol, ethyl alcohol, n-propyl alcohol, isopropyl alcohol, n-butyl alcohol, sec- butyl alcohol, tert- butyl alcohol, isobutyl alcohol and n-pentanol; amides such as dimethylformamide and dimethylacetamide; ketones or keto alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol and polyethylene glycol; alkylene glycols of which the alkylene group contains 2 to 6 carbon atoms such as ethylene glycol, propylene glycol, trimethylene glycol, triethylene glycol and 1,2,6-hexanetriol; glycerol; lower alkyl ethers such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols such as triethylene glycol dimethyl (or diethyl) ether and tetraethylene glycol dimethyl (or diethyl) ether; alkanolamines such as monoethanolamine, diethanolamine and triethanolamine; sulfolane, N-methyl-2-pyrrolidone, 2-pyrrolidone, 1,3-dimethyl-2-imidazolidinone. These water-soluble organic solvents can be used singly or in combination thereof.

[Penetrability of Ink into Recording Medium]

When the penetrability of the ink into a recording medium is controlled by regulating the Ka value, for example, less than 1 $(ml \cdot m^{-2} \cdot msec^{-\frac{1}{2}})$, the ink of this embodiment containing the above described components can give, in combination with a treating liquid described later, an ink dot having an extremely uniform density and a sharp edge with an excellent fixation speed and fixation properties to the recording medium. The penetrability of the ink into a recording medium will be described below.

When the penetrability of an ink is expressed by the ink amount V per m² of a medium, the penetration amount V (ml/m²=μm) of the ink into a recording medium after a predetermined time t from the ejection of an ink droplet is expressed by the Bristow equation:

$$V = Vr + Ka(t-tw)^{1/2},$$

where tw is a contact time and Vr is an amount of ink absorbed into the rough portion of the recording medium (t>tw).

Immediately after the landing of an ink droplet to the surface of the recording medium, almost all ink is absorbed in the rough portion of the recording medium (uneven surface portion of the recording medium) and nearly no ink has penetrated inside the recording medium. This period is defined as the wet time (tw) and the amount of ink absorbed in the rough portion during the wet time is defined as Vr. After the wet time, the amount of the ink (V) penetrating into the recording medium increases in proportion to ½ power of the elapsed time exceeding the wet time, i.e., (t−tw). Ka is a proportional coefficient of this increment and corresponds to the penetration rate.

The Ka value can be determined by using a test device on dynamic penetrability of liquid by the Bristow method (e.g., Dynamic Penetrability Testing Device S, trade name, a product of TOYO Seiki Mfg., Ltd.), using PB paper from Canon Inc. as a recording medium (recording paper). This PB paper is a recording paper usable in a copying machine or laser beam printer utilizing the electrophotographic process, as well as in ink-jet printing.

Similar result can be obtained when PPC paper, paper for electrophotography from Canon Inc. is used.

The Ka value changes according to the type and amount of the surfactant added. For example, addition of a nonionic surfactant, ethylene oxide-2,4,7,9-tetramethyl-5-decyen-4,7-diol (hereinafter referred to as "Acetylenol EH," a product name, Kawaken Fine Chemicals Co., Ltd.), increases the penetrability.

Inks containing no Acetylenol EH (0% Acetylenol EH content) have low penetrability, being a less penetrating ink described later. Inks containing 1% Acetylenol EH penetrate into the recording paper in a short period of time, being a highly-penetrable ink described later. Inks containing 0.35% Acetylenol EH are semi-penetrable, having properties intermediate between the above two types.

TABLE 1

| | Ka value (ml/ (m² · msec$^{1/2}$)) | Acetylenol content (%) | Surface tension (dyne/cm) |
|---|---|---|---|
| Less penetrating ink | <1 | 0≦ and <0.2 | ≦40 |
| Semi-penetrating ink | 1≦ and <5 | 0.2≦ and <0.7 | 35≦ and <40 |
| Highly penetrating ink | 5≦ | 0.7≦ | <35 |

Table 1 shows Ka value, Acetylenol EH content (%) and surface tension (dyne/cm) of each of "less penetrating ink", "semi-penetrating ink" and "highly-penetrating ink". As seen from the table, an ink having a larger Ka value has a higher penetrability to the recording paper. In other words, an ink having a smaller surface tension has a higher penetrability.

The Ka values shown in Table 1 were measured by Dynamic Penetrability Tester S for Liquids (by Toyo Seiki Co., Ltd.) based on the Bristow method as described above. In this experiment, the aforementioned PB paper (Canon Inc.) was used as the recording paper. Similar results were obtained with the aforementioned PPC paper (Canon Inc.).

The "highly-penetrable ink" contains Acetylenol EH 0.7% or more and shows high penetrability. The penetrability of the ink of this embodiment is preferably set to be smaller than the Ka value of "over-coating ink," that is, smaller than 1.0 (ml. m$^{-2}$·msec$^{-1/2}$), more preferably smaller than 0.4 (ml·m$^{-2}$·msec$^{-1/2}$).

[Addition of Dye]

Dyes may be added to the ink of this embodiment. The ink which contains the first and the second pigments as well as a dispersant for dispersing the second pigment in an aqueous medium, and a dye added thereto, in combination with a treating liquid described later, can form an ink dot of higher quality on a recording medium in a short fixing time. Although it has been already mentioned that the aggregating force of the second pigment is eased in the presence of the first pigment, it is also considered that the addition of a dye further eases the aggregating force of the second pigment, thereby effectively suppresses the unevenness in a printed image such as "crazing" which often occurs on a recording medium of less ink absorbency than the plain paper. Dyes applicable to the ink of this embodiment include, for example, an anionic dye and a cationic dye. Preferably the dye having the same polarity as that of the group bonded to the surface of the first pigment is used.

[Anionic and Cationic Dyes]

As the anionic dyes described above which are soluble in an aqueous medium and can be used in this embodiment, known acid dyes, direct dyes and reactive dyes are suitably used. As the cationic dyes, known basic dyes are suitably used. Preferably used are anionic and cationic dyes having a disazo- or triazo skeleton structure. Further, preferably two or more dyes different in the structure are used jointly. Dyes other than black dyes, such as cyan, magenta and yellow dyes, may be used as long as the tone of the ink does not change greatly.

[Addition Amount of Dye]

Dye may be added in an amount ranging from 5 to 60 wt % of the whole coloring material. To exploit the effect of mixing of the first and second pigments more effectively, however, the addition amount of the dye is preferably lower than 50 wt %. Further, for the inks of which the printing properties on plain paper are regarded important, the dye amount preferably ranges from 5 to 30 wt %.

[Treating Liquid]

When the first pigment contained in the ink has anionic groups bonded onto the surface, suitably used is a treating liquid containing a compound having at least one cationic group capable of reacting with the above anionic groups. On the other hand, when the first pigment contained in the ink has cationic groups bonded onto the surface, suitably used is a treating liquid containing a compound having at least one anionic group capable of reacting with the above cationic groups.

The above cationic compound includes, for example, relatively low molecular weight compounds having about one cationic group per molecule and relatively high molecular weight compounds having multiple cationic groups per molecule. The preferable examples of cationic compounds of relatively low molecular weight include, for example, primary- or secondary- or tertiary-amine salt compounds such as hydrochloride salts or acetates of laurylamine, coconut amine, stearylamine and rosinamine; quaternary ammonium salts such as lauryltrimethylammonium chloride, lauryldimethylbenzylammonium chloride, benzyltributylammonium chloride, benzalkonium chloride and cetyltrimethylammonium chloride; pyridinium salt type compounds such as cetylpyridinium chloride and cetylpyridinium bromide; imidazoline cationic compounds such as 2-heptadecenyl-hydroxyimidazoline; and ethylene oxide adducts of secondary alkylamine such as dihydroxyethylstearylamine.

For the present invention, amphoteric surfactants showing cationic characteristics in a certain pH range can also be used. Specific examples of such amphoteric surfactants include, for example, $RNHCH_2$—$CH_2COOH$ type compounds, which are amino acid type amphoteric surfactants, and betaine type compounds such as stearyldimethylbetaine and lauryldihydroxyethylbetaine. Of course, when using any one of these amphoteric surfactants, preferably pH of the treating liquid is made lower than the isoelectric point of the surfactant, or preferably the treating liquid is prepared to have a pH value lower than the isoelectric point of the surfactant when it is mixed with an ink on a recording medium. The polymer cationic compounds include, for example, poly(allylamine), poly(amine sulfone), poly(vinylamine), chitosan, and neutralized or partially neutralized products thereof with an acid such as hydrochloric acid and acetic acid.

As the anionic compounds, for example, anionic surfactants can be used. As the anionic surfactants, commonly used surfactants such as carboxylate surfactants, sulfate ester surfactants, sulfonate surfactants and phosphoric ester surfactants can be used. The anionic polymer components include, for example, alkaline-soluble resins such as poly (sodium acrylate) or polymers partially copolymerized with acrylic acid, but not limited thereto. More specifically, the anionic compounds include, for example, disodium lauryl sulfosuccinate, disodium polyoxyethlenelauroylethanolamidoester sulfosuccinate, disodium polyoxyethlenealkylsulfosuccinate, sodium salts of carboxylated polyoxyethlenelaurylether, sodium salts of carboxylated polyoxyethlenelaurylether, sodium salts of carboxylated polyoxyethlenetridecylether, sodium polyoxyethlenelaurylethersulfate, triethanolamine polyoxyethlenelaurylethersulfate, sodium polyoxyethlenealkylethersulfate, sodium polyoxyethlenealkylethersulfate, sodium alkylsulfate and triethanolamine alkylsulfate, but not limited thereto.

The treating liquid may include water, water-soluble organic solvents and other additives, in addition to the cationic or anionic compounds described above. The water-soluble organic solvents include, for example, amides such as dimethylformamide and dimethylacetamide; ketones such as acetone; ethers such as tetrahydrofuran and dioxane; polyalkylene glycols such as polyethylene glycol, polypropylene glycol; alkylene glycols such as ethylene glycol, propylene glycol, butylene glycol, triethylene glycol, 1,2,6-hexanetriol, thiodiglycol, hexylene glycol and diethylene glycol; lower alkyl ethers of polyhydric alcohols such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; in addition, glycerol, N-methyl-2-pyrrolidone, 1,3-dimethylimidazolidinone, triethanolamine, sulfolane, dimethyl sulfoxide. The above water-soluble organic solvents are not restricted to any fixed content; however, the content preferably ranges from 5 to 60 wt % of the whole liquid, more preferably 5 to 40 wt %.

In this embodiment, the above-described treating liquid is preferably prepared to have a high penetrability to the recording medium to enhance the fixation rate or to improve the fixation properties of the ink dot to the recording medium.

In this embodiment, as long as the treating liquid and the ink are provided to a recording medium in this order, as described above, the above desired results can be obtained.

How to realize this application order of the ink and the treating liquid is determined by an actual constitution. For example, when a serial type head is used, the above-described order can be realized by multiple scanning operations to the same region with the intervenient paper conveying action. Such a case is also embraced by the present invention.

As described above, the ink of the present invention is provided to a recording medium after the liquid treatment. The number of the ink droplets is not necessarily limited to one.

For example, the ink may be provided in the form of two droplets after the treating liquid was applied. In this case, preferably the ink droplets provided earlier contains the second pigment at a content higher than that of the first pigment, while the ink droplet provided later contains the first pigment at a content higher than that of the second pigment.

In cases where the ink is provided in the form of multiple droplets as described above, the total amount of the provided ink droplets is set to be almost the same the ink droplet when the ink is provided in one droplet. In other words, according to the embodiment of the present invention, even if the ink is provided in multiple droplets and the amount of each droplet decreases according to the number of the droplets, the above-described desired results can be obtained.

In this embodiment, as long as the above desired results can be obtained, the time interval between the treating liquid application and the ink application does not matter. Any time interval, as long as it brings the above desired results, is embraced by the present invention.

In other words, the reaction of the mixed ink and the treating liquid occurs in various forms depending on the time from the treating liquid application to the ink application. It has been observed that, for example, even when the above time lag is short, the pigments etc. and the treating liquid are sufficiently mixed in the peripheral region or the edge portion of a dot formed by the overlapped treating liquid and ink, at least suppressing "haze".

From this standpoint, the term "reaction" between the treating liquid and the ink used herein includes a case when the dispersion state of the pigment in the ink becomes unstable by the contact of the ink and the treating liquid, to cause the pigment agglomeration, precipitation, or viscosity increase in the ink. This "reaction" is not limited to a case when the ink droplet and the treating liquid droplet applied onto the recording medium are mixed as a whole but includes a case when the respective droplets contact at their edge to cause the above mentioned phenomenon.

In this invention, that "the treating liquid and the ink contact in a liquid state" includes a case when the components of the treating liquid penetrated in the recording medium react with the ink applied after the treating liquid in the recording medium.

The color tone (type), density and number of the ink provided to a recording medium in this embodiment can be combined in a desired manner, as long as the ink is provided according to the order described above. The ink types commonly used include, for example, black (Bk), yellow (Y), magenta (M) and cyan (C). For each color, inks of two density grade can be used. More specifically, at least one ink may be selected from an yellow ink, a magenta ink and a cyan ink as the ink of the first embodiment containing the first and the second pigment to be applied after the treating liquid to a recording medium.

Of the combinations to which the present invention is applicable, the most preferable is a case where the ink of this embodiment is a black ink, because the effect of this embodiment such as increase in OD value and suppression of "haze" can most effectively contribute to the quality of printed characters.

To apply the ink and the treating liquid to a recording medium, there are various methods, for example, coating of the medium, direct contact with the medium, and so on. All those processes are embraced in the present invention; however, the most preferable one is an ink-jet process utilizing print heads. In this process, the combination and arrangement of print heads, as ink-ejecting portions, can be determined according to the order of providing the ink as well as the combination of ink types including the treating liquid, described above.

To be specific, the order of providing an ink and a treating liquid, described above, is made possible by such a constitution that the print heads for the ink and the treating liquid are arranged in the direction in which the print heads travel relative to a recording medium.

To be more specific, the method of providing ink and a treating liquid according to the present invention described above is made possible by any of the following types print head: so called "full multi-type print head" in which ink-ejecting ports are arranged in the range corresponding to the entire width of the printing area of the recording medium, and is called "serial-type print head" which travels on a recording medium for scanning.

As the ink ejecting method of these print heads, any known methods, such as the piezo ink-jet method, can be adopted. However, the most preferable method is such that a bubble is generated in the ink or treating liquid utilizing heat energy and the ink or treating liquid is ejected by the pressure of the bubble.

Usually, the areas to which the droplets of the ink and the treating liquid ejected from the print heads are controlled to be one pixel unit to form the print image, so that the areas precisely overlap. The application of the present invention is, however, not limited to this constitution. The present invention also includes such constitution that partial overlapping of the ink dot and the treating liquid dot to provide the effect of this embodiment, and such constitution that the treating liquid is not provided to all pixels but intermittently provided so that the treating liquid flowing in from the adjoining pixel by bleeding reacts with the pigment etc.

[Embodiment 1-2]

Another embodiment of the present invention will be described below.

This embodiment aims at further rapid ink fixation by increasing the penetrability of the treating liquid.

The rapid ink fixation is a significant factor for high speed printing or enhancing throughput. The throughput can be directly enhanced by increasing the drive frequency of the print heads and the recording medium conveyance speed. However, if the ink on a recording medium is not fixed yet even after the output of the printed recording medium, handling of such a medium is not easy, and another recording medium may be stained by the ink in a construction where the output recording media are piled up.

Of various factors contributing to the enhancement of printing speed, first comes the output speed of the printed recording medium, which depends on the conveyance speed of a recording medium or the scanning speed of the print heads. That is, in an apparatus using the full multi-type print heads, the conveyance speed of a recording medium in printing operation is directly related to the output speed of the printed recording medium, while in an apparatus using the serial type-print heads, the scanning speed of the heads is related to the output speed of the printed recording medium in the end. The conveying speed of a recording medium correlates with the ink-ejection frequency for one pixel and the print resolution, i.e., dot density. Specifically, in a construction where a single pixel is printed with ink droplets ejected from multiple print heads, if the print resolution is fixed, the ejecting frequency per pixel correlates with the above-described conveyance speed.

In this embodiment, use of a treating liquid of a high penetration speed enables relatively rapid fixation even when an ink of a relatively low penetration speed is employed for OD value enhancement.

[Choice of Treating Liquid]

The composition of the treating liquid is as described above in general. In order to fully enjoy the advantages of the present invention, it is preferable to optimize the composition of the treating liquid according to the type and amount of a first and second pigments and a polymer dispersant contained in ink. This point will be described below with specific examples.

Prepared were an ink containing a self-dispersing carbon black having an anionic group bonded onto its surface as a first pigment, a commonly used carbon black as a second pigment, and styrene-acrylic acid-ethyl acrylate copolymer (acid value of 180, average molecular weight of 12000) as a polymer dispersant; and a treating liquid containing benzalkonium chloride (EBK) as a low-molecular weight cationic compound and polyallylamine (PAA) as a cationic polymer dispersant at a fixed ratio (PAA: 3.6%, EBK: 0.5%). By varying the ratio of the self-dispersing carbon black to the common carbon black in the ink, and varying the amount of the polymer dispersant according to the amount of the common carbon black, images were formed and evaluated for image properties.

Figure 5A:
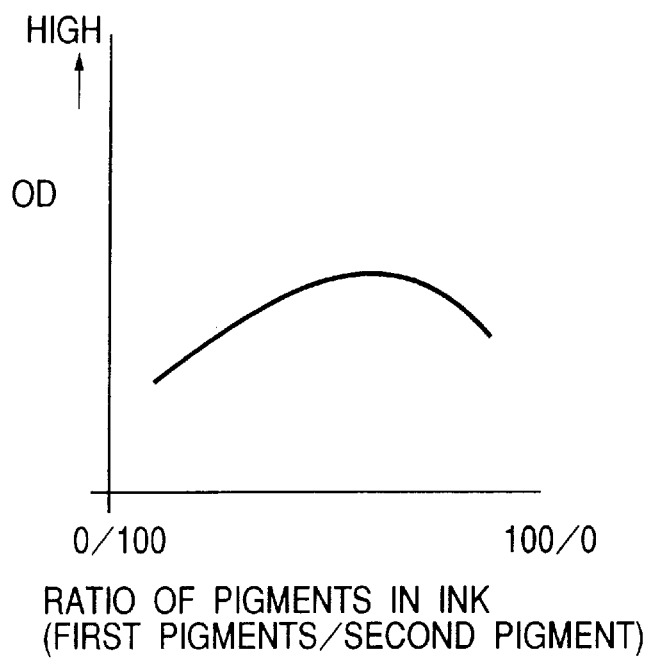
FIG. 5A is a graph roughly showing the change of OD of an image in relation to the ratio of a first pigment to a second pigment in an ink.

FIG. 5A is a graph schematically illustrating the change in OD of the image obtained when the ratio of the first pigment to the second pigment in the ink was varied while the composition of the treating liquid was fixed. As seen from this graph, the image has the maximum OD value when the ratio of the first pigment to the second pigment is at a certain value.

Figure 5B:
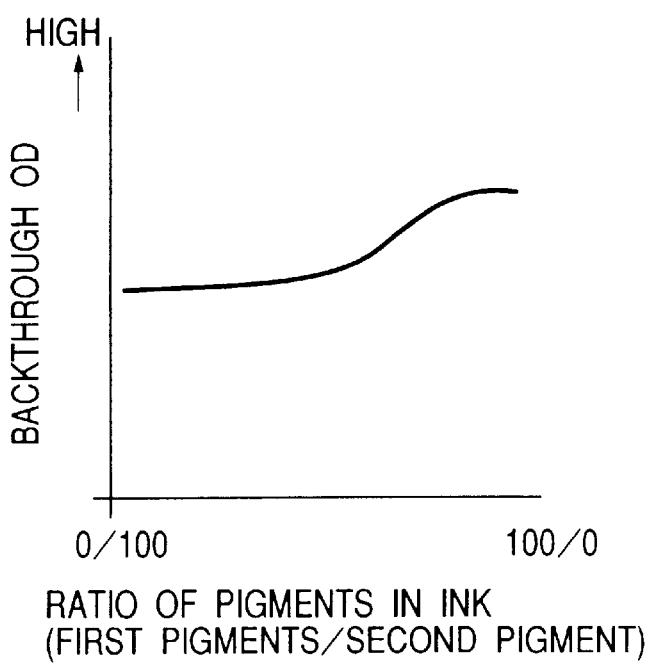
FIG. 5B is a graph roughly showing the change of back-through OD of an image in relation to the ratio of a first pigment to a second pigment in an ink.

FIG. 5B is a graph schematically illustrating the change in OD of the backthrough image, measured from the back side of the recording medium (back-through OD), of the image of FIG. 5A. It is clear that the ratio of the first pigment to the second pigment relates to the back-though OD to a certain extent.

Similar experiments were carried out varying the ratio of EBK to PAA in the treating liquid. As a result, when the EBK ratio is increased, OD tends to decrease, but when the PAA ratio is increased, OD would not decrease so much. However, even when the EBK ratio is increased, OD increases as the ratio of the first pigment to the second pigment is increased. The fixation time becomes short with the increase of EBK. It also increases with the increase of the first pigment.

Figure 3A:
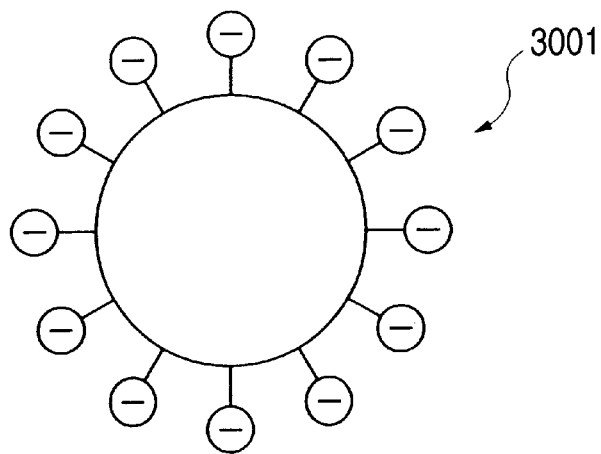
FIG. 3A is a notional illustration of the molecule of an anionic self-dispersing pigment.
Figure 3B:
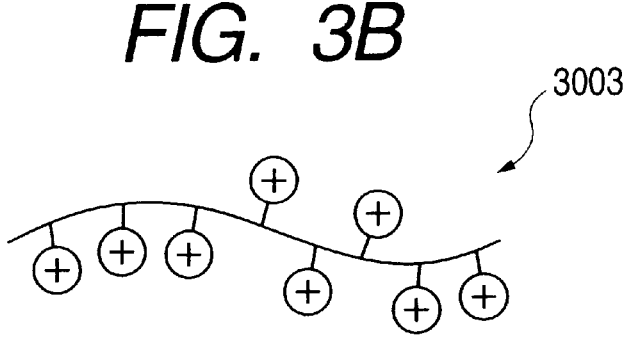
FIG. 3B is a notional illustration of the molecule of a cationic polymer compound.
Figure 3C:
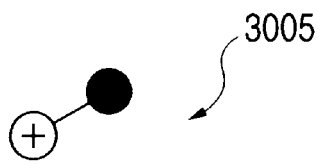
FIG. 3C is a notional illustration of a molecule of a cationic surfactant.

From these facts, it is presumed that there is a close relationship between PAA and the carbon black dispersed by the polymer dispersant, and EBK and the self-dispersing carbon black, which may be explained by the following presumptive mechanism. The self-dispersing carbon black is in the form schematically shown in FIG. 3A, and a cationic polymer PAA is in a string-like form having multiple cationic groups in one molecular as shown in FIG. 3B. When the treating liquid containing only PAA but not EBK is mixed with the self-dispersing carbon black in the ink, the polymer PAA entwines around the self-dispersing carbon black as shown in FIG. 4. However, since every cationic group of PAA cannot bond to an anionic group of the pigment for the geometrical reason, the self-dispersing carbon black to which PAA is binding as shown in FIG. 4 is cationic as a whole. In other words, the dispersibility of the pigment is not fully destroyed. And, when each of the fine pigment particles in the ink becomes surrounded by cationic groups, electrical repulsion force acts stronger than the intermolecular attraction force to inhibit the aggregation of the fine pigment particles, thus enhancing the tendency of the fine pigment particles to penetrate into the recording medium rather than to remain on the surface of the recording medium. As a result, the treating liquid acts in a way to prevent the enhancement of OD and edge sharpness. However, if EBK molecules having the form shown in FIG. 3C exist in the treating liquid, the reaction of the self-dispersing carbon black and PAA progresses becomes competitive with EBK; consequently, the formation of the PAA—self-dispersing carbon black complex is decreased. On the other hand, in regards with the second pigment, PAA entwines with the polymer dispersant attached on the surface of the second pigment particles. As a result, the dispersibility of the second pigment in the ink is fully destroyed to make the second pigment remain on the surface of the recording medium. Thus OD and edge sharpness are enhanced.

To be more concrete, by a combination use of an ink containing a self-dispersing carbon black and a carbon black to be dispersed by a polymer dispersant at a ratio of 1:1 and a highly penetrating treating liquid containing polyallylamine and benzalkonium chloride at a ratio of (PAA: 3.6%, EBK: 0.5%), an image excellent in fixing properties and especially in edge sharpness can be obtained.

Further, the combination use of an ink containing a self-dispersing carbon black and a carbon black to be dispersed by a polymer dispersant at a ratio of 9:1 and a highly penetrating treating liquid containing polyallylamine and benzalkonium chloride at a ratio of (PAA: 0.5%, EBK: 4%) can provide an image of especially excellent image quality with rapid fixation. One of the reasons why this embodiment enables compatibility of rapid fixation and high image quality is the low viscosity of the reaction liquid, since the treating liquid contains no polymer compound and the amount of the polymer dispersant in the ink is small.

[Embodiment 2]

While the first embodiment of the present invention has been described mostly in a form where a first and second pigments are contained in one ink, it is to be understood that another form in which two inks contain a first and second pigments respectively is also embraced by the present invention.

[Embodiment 2-1]

In this embodiment, a first ink containing a first pigment, a second ink containing a second pigment, and a treating liquid which reacts with both of the first and the second ink are provided onto the surface of a recording medium in such a manner that they come in contact with each other in a liquid state, at which the treating liquid is provided before the application of the first and second inks. By this, almost the same advantages as in the above embodiment of the present invention can be obtained.

EXAMPLES

Examples of the present invention will be described in detail with reference to the drawings. It is to be understood that the present invention is not limited to these specific examples, and that it is capable of covering other examples such as the combinations thereof and of being applied to other technical fields involved in the similar problems.

EXAMPLE 1-1

Figure 6:
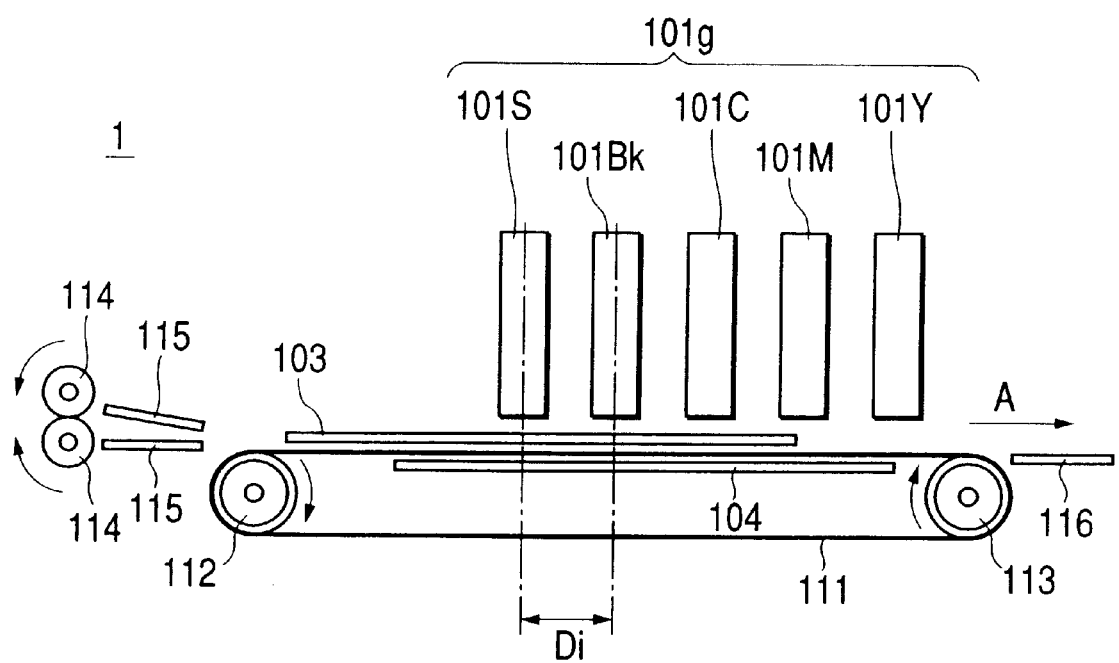
FIG. 6 is a schematic configuration of a printing apparatus relevant to one embodiment of the invention.

FIG. 6 is a side view schematically illustrating a full line type printing apparatus according to the first example of the present invention. This printing apparatus 1 adopts an ink-jet printing method in which printing is carried out by ejecting an ink or a treating liquid from multiple full line type print heads (ejecting portions) arranged in prescribed positions toward the direction in which a recording medium as a recording medium is conveyed (in the direction shown by the arrow A in the figure). It operates under control of a control circuit shown in FIG. 7 described later.

Each print head 101*Bk*1, 101*Bk*2, 101S, 101C, 101M and 101Y of a head group 101*g* has about 7200 ink-ejecting ports arranged in the transverse direction of a recording paper 103 (in the direction perpendicular to the sheet showing the figure) conveyed in the direction shown by the arrow A in the figure. The printing apparatus can perform printing on a recording paper to a maximum size of A3. The recording paper 103 is conveyed in the direction A with the aid of rotation of a pair of resist rollers 114 which is driven by a conveyance motor, guided by a pair of guide plates 115 so as to register its tips, and conveyed by a conveyance belt 111. The conveyance belt 111 which is an endless belt is held by two rollers 112 and 113, and the displacement in vertical direction of its upper side portion is regulated by a platen 104. When the roller 113 is rotationally driven, the recording paper is conveyed. The recording paper 113 is held to the conveyance belt 111 by electrostatic holding. The roller 113 is rotationally driven by a driving source, such as a motor, not shown in the figure in such a direction that the recording paper 103 is conveyed in the direction shown by the arrow A. The recording paper 103 having been subjected to recording while being conveyed on the conveyance belt 111 is delivered onto a stocker 116.

Print heads of a recording head group 101*g* consisting of two heads 101*Bk*1 and 101*Bk*2 for ejecting a black ink, a head 101S for ejecting a treating liquid and heads for ejecting color inks (a cyan head 101C, a magenta head 101M and an yellow head 101Y), described in the above embodiment 1, are arranged in the direction A in which the recording paper 103 is conveyed. Print of black letters and color images are made possible by ejecting each colored ink and the treating liquid from each print head.

Figure 7:
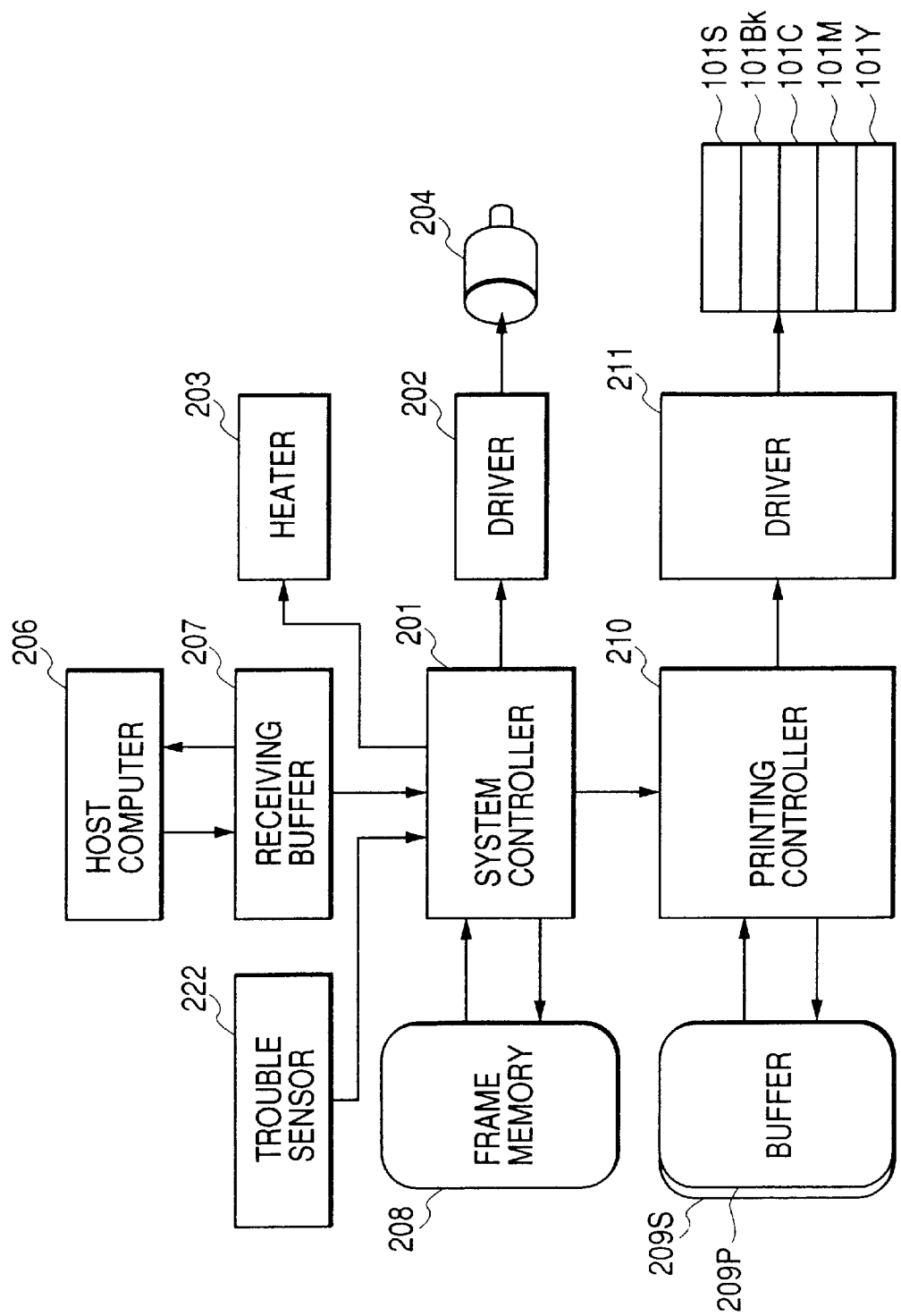
FIG. 7 is a block diagram showing the control system of the printing apparatus described in FIG. 6.

FIG. 7 is a block diagram illustrating a control system of the full line type printing apparatus 1 of FIG. 6.

A system controller 201 includes a microprocessor, ROM for storing a control program executed in this apparatus and RAM used as a work area when the microprocessor performs processing, and controls the entire apparatus. A motor 204 rotates the roller 113 shown in FIG. 6 to convey recording paper while its drive is being controlled via a driver 202.

A host computer 206 transfers the information to be printed to the printing apparatus 1 of this embodiment and controls the printing operation. A receiving buffer 207 temporarily stores the data from the host computer 206 until the system controller 201 reads the data. A frame memory 208 is a memory for expanding the data to be printed to image data and has a memory size required for printing. Although the frame memory 208 is described as being capable of storing data for a sheet of recording paper in this embodiment, the present invention is not intended to be limited to a specific memory capacity.

Buffers 209S and 209P temporarily store the data to be printed, and their storage capacity varies depending on the number of ejecting ports of print heads. A printing controller 210 is provided for properly controlling the drive of print heads under the command from the system controller 201 and controls drive frequency, the number of printing data, etc., and in addition, creates data for ejecting a treating liquid. A driver 211 drives the print head 101S for ejecting the treating liquid as well as the print heads 101Bk1, 101Bk2, 101C, 101M and 101Y for ejecting their respective inks and is controlled by the signal from the printing controller 210.

In the above system, print data are transferred from the host computer 206 to the receiving buffer 207 to be temporarily stored. The print data stored in the receiving buffer 207 is read by the system controller 201 and expanded to the buffers 209S and 209P. And paper jam, out-of-ink, out-of-paper, etc. can be detected by various detection signals from a trouble sensor 222.

The printing controller 210 creates liquid treatment data for ejecting the liquid treatment based on the image data expanded to the buffers 209S and 209P. It also controls the ejection operation of each print head based on the print data in the buffers 209S and 209P and the liquid treatment data.

In this embodiment, an ink with a low penetrating speed (hereinafter referred to as a less penetrating ink) was used as the black ink ejected from the head 101Bk, and as the treating liquid and the cyan, magenta and yellow inks, those having a high penetration speed were used (hereinafter referred to as highly-penetrating treating liquid and inks).

The composition of the treating liquid and each ink used in this embodiment are as follows. The ratio of each ingredient is shown in part by weight.

| [Treating liquid] | |
|---|---|
| glycerol | 7 parts |
| diethylene glycol | 5 parts |
| Acetylenol EH | 2 parts |
| (from Kawaken Fine Chemicals Co., Ltd.) | |
| polyallylamine | 4 parts |
| (molecular weight: 1500 or less, average: about 1000) | |
| acetic acid | 4 parts |
| benzalkonium chloride | 0.5 parts |
| triethylene glycol monobutyl ether | 3 parts |
| water | the rest |
| [Yellow (Y) Ink] | |
| C.I. Direct Yellow 86 | 3 parts |
| glycerol | 5 parts |
| diethylene glycol | 5 parts |
| Acetylenol EH | 1 part |
| (from Kawaken Fine Chemicals Co., Ltd.) | |
| water | the rest |

-continued

| [Magenta (M) Ink] | |
|---|---|
| C.I. Acid Red 289 | 3 parts |
| glycerol | 5 parts |
| diethylene glycol | 5 parts |
| Acetylenol EH | 1 part |
| (from Kawaken Fine Chemicals Co., Ltd.) | |
| water | the rest |
| [Cyan (C) Ink] | |
| C.I. Direct Blue 199 | 3 parts |
| glycerol | 5 parts |
| diethylene glycol | 5 parts |
| Acetylenol EH | 1 part |
| (from Kawaken Fine Chemicals Co., Ltd.) | |
| water | the rest |
| [Black (Bk) Ink] | |

[Pigment Dispersion 1]

10 g of carbon black with a surface area of 230 m$^2$/g and a DBP oil absorption of 70 ml/100 g and 3.41 g of p-aminobenzoic acid were fully mixed in 72 g of water, then 1.62 g of nitric acid was added dropwise and stirred at 70° C. After several minutes, a solution of 1.07 g of sodium nitrite in 5 g of water was added and stirred for additional 1 hour. The slurry obtained in this manner was filtered with Toyo filter paper No. 2 (from Advantist Co., Ltd.), and its pigment particles were fully water-washed, followed by the drying in an oven at 90° C. Then water was added the pigment to prepare 10 wt % pigment aqueous solution. Thus, obtained was a pigment dispersion in which an anionically charged self-dispersing carbon black having a hydrophilic group bonded onto its surface via a phenyl group, as shown by the following formula, was dispersed.

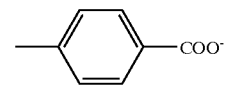

[Pigment Dispersion 2]

The pigment dispersion 2 was prepared as follows. 14 parts of styrene-acrylic acid-ethyl acrylate copolymer (acid value of 180, average molecular weight of 12000), as a dispersant, 4 parts of monoethanolamine and 72 parts of water were mixed. And the mixture was heated to 70° C. in a water bath to completely dissolve the resin content. Resin cannot sometimes be completely dissolved if its content is low. Accordingly, when intending to dissolve resin, a solution with a desired resin content may be prepared by diluting the solution with a high resin content previously prepared. To this solution added was 10 parts of carbon black (brand name: MCF-88, pH 8.0, from Mitsubishi Chemical Industries Ltd.), which is dispersible in an aqueous solution only with the aid of the action of a dispersant, and the solution was subjected to premixing for 30 minutes. Then the following operation was carried out to obtain the pigment dispersion 2 in which the carbon black (MCF-88) was dispersed in an aqueous medium with the aid of a dispersant.

Disperser: Side Grinder
  (Igarashi Machine Industry Co., Ltd.)
Grinding medium: zirconia beads with a 1 mm diameter Packing of grinding medium: 50% (by volume)
Grinding duration: 3 hours
Centrifuging (12000 RPM, 20 minutes)

| <Preparation of black ink> | |
|---|---|
| pigment dispersion 1 | 25 parts |
| pigment dispersion 2 | 25 parts |
| glycerol | 6 parts |
| diethylene glycol | 5 parts |
| Acetylenol EH | 0.1 parts |
| (from Kawaken Fine Chemicals Co., Ltd.) | |
| water | the rest |

The Ka value of this black ink was 0.33.

By using the black inks according to the example described above, an ink containing a self-dispersing carbon black and an ink containing a polymer dispersant and a carbon black dispersible with the aid of the polymer dispersant are mixed with each other to be dispersed, to which a treating liquid containing two cationic compounds (polyallylamine and benzalkonium chloride) of a polarity opposite to that of the inks reacts.

In this example, ink-ejecting ports of each print head were arranged at a density of 600 dpi, and printing was carried out at a dot density of 600 dpi in a direction of the conveyance of the recording paper. Accordingly, the dot density of a printed image etc. in this example is 600 dpi in both row and column. The ejecting frequency of each head was 4 KHz, accordingly the conveyance speed of recording paper is about 170 mm/sec. The distance Di between the head 101$Bk$1 for ejecting a mixed ink and the head 101S for ejecting a treating liquid (see FIG. 6) is 40 mm, accordingly the time interval from the ejection of the treating liquid to the ejection of the black ink is about 0.24 sec.

The ejecting amount of each print head was 15 pl (picoliter) per ejection. When additional experiments were carried out in which the time interval from the ejection of the treating liquid S to the ejection of the black ink Bk was decreased to the minimum of 0.1 sec, similar results were obtained.

EXAMPLE 1-2

An experiment was carried out in the same manner as in the above examples 1-1, except that the composition of each of the treating liquid and the black ink was changed as follows.

| [Treating liquid] | |
|---|---|
| glycerol | 7 parts |
| diethylene glycol | 5 parts |
| Acetylenol EH | 2 parts |
| (from Kawaken Fine Chemicals Co., Ltd.) | |
| polyallylamine | 0.5 parts |
| (M.W. 1500 or less, average: about 1000) | |
| acetic acid | 0.5 parts |
| benzalkonium chloride | 4 parts |
| triethylene glycol monobutyl ether | 3 parts |
| water | the rest |
| [Black (Bk) Ink] | |
| pigment dispersion 1 | 45 parts |
| pigment dispersion 2 | 5 parts |
| glycerol | 6 parts |
| diethylene glycol | 5 parts |
| Acetylenol EH | 0.1 parts |
| (from Kawaken Fine Chemicals Co., Ltd.) | |
| water | the rest |

The Ka valuE of this black ink was 0.33.

EXAMPLE 1-3

An experiment was carried out in the same manner as in the above examples 1-1, except that the composition of each of the treating liquid and the black ink was changed as follows.

| [Treating liquid] | |
|---|---|
| glycerol | 7 parts |
| diethylene glycol | 5 parts |
| Acetylenol EH | 2 parts |
| (from Kawaken Fine Chemicals Co., Ltd.) | |
| polyallylamine | 1 part |
| (molecular weight: 1500 or less, average: about 1000) | |
| acetic acid | 1 part |
| benzalkonium chloride | 4 parts |
| triethylene glycol monobutyl ether | 3 parts |
| water | the rest |
| [Black (Bk) Ink] | |
| pigment dispersion 1 | 45 parts |
| pigment dispersion 2 | 2.5 parts |
| C.I. Food Black 2 | 0.25 parts |
| glycerol | 6 parts |
| diethylene glycol | 5 parts |
| Acetylenol EH | 0.1 parts |
| (from Kawaken Fine Chemicals Co., Ltd.) | |
| water | the rest |

The Ka value of this black ink was 0.33.

COMPARATIVE EXAMPLE 1

For comparison, an ink having the following composition was prepared using only the pigment dispersion 2 prepared in the same manner as in the example 1-1, but only using the pigment dispersion 2. Then printing was carried out under the same conditions as in Example 1-1. In this comparative example, no treating liquid was used.

| pigment dispersion 2 | 50 parts |
|---|---|
| ethylene glycol | 8 parts |
| glycerol | 5 parts |
| isopropyl alcohol | 4 parts |
| water | the rest |

COMPARATIVE EXAMPLE 2

Printing was carried out, using the ink prepared in the same manner as in Comparative Example 1, except that using a Bk head which ejects about 30 pl per ejection, the ink amount provided per pixel was 30 pl. Evaluation results for each printed matter obtained in Examples 1-1 to 1-3 and Comparative Examples 1 and 2 are shown in Table 2.

TABLE 2

|  | Example 1-1 | Example 1-2 | Example 1-3 | Comp. Example 1 | Comp. Example 2 |
|---|---|---|---|---|---|
| OD | 1.42 | 1.40 | 1.42 | 1.00 | 1.35 |
| Water-fastness expression | within a few second | within a few second | within a few second | about 1 hour | about 1 hour |
| Fixability | 0.5 sec | <0.5 sec | <0.5 sec | 15 sec | 40 sec |
| Feathering (haze) | A | A | A | A | A |

In the Examples and Comparative Examples, a predetermined image was printed on PB paper (Canon Inc.) to measure the optical density of the black region. In Table 2, "OD" is the optical density measured by a Macbeth transmission reflection densitometer; "Development of Water Fastness" represents the time after printing by when the printed image becomes not to be corrupted by water dropped thereon; "Fixability" represents the time after printing by when almost no offset is observed. In "Feathering", evaluation "A" means feathering or haze was not observed around the dot image under a magnifying glass and "B" means feathering or haze were observed.

As seen from Table 2, in comparison with the conventional pigment ink, the system of the present invention can provide printed matters excellent in OD value, time for water fastness development and fixing properties.

With regard to OD value, in the Examples using both the treating liquid and an ink containing a first pigment not requiring a dispersant for dispersion, a second pigment requiring of a dispersant for dispersion and a polymer dispersant, high OD values can be obtained compared with the instances where an ink containing only the second pigment was used.

In terms of the ability of inhibiting feathering ("haze" and "bleeding") from occurring and giving the sharpness of the edge portion, evaluation was made while varying the time from the ejection of a treating liquid from the head 101S to the ejection of an ink from the head 101Bk. Results superior to the comparative examples were obtained. Even when the time interval was made 0.1 second, almost the same result was obtained.

The full multi-type printing apparatus described above is especially suitable for high-speed printing, because its print heads are used in a fixed state during the printing operation and the time required for conveying recording paper is almost the same as the time required for printing. Thus, when applying the present invention in such printing apparatus, its high-speed printing function can be further enhanced and printing of higher quality, that is, printing with a higher OD value and free from bleeding and haze is made possible.

The printing apparatus of the present invention is generally used as a printer, but it can be used as a printing portion of copying machines, facsimiles, etc.

Although Examples and Comparative Examples to show the effects of the present invention were carried out using one head for the black ink, it is to be understood that the present invention is not limited to this specific example. The construction in which two heads eject the black ink with an ejection amount of about 8 pl (in total about 16 pl) can also produce the same effect.

EXAMPLE 2

Figure 8:
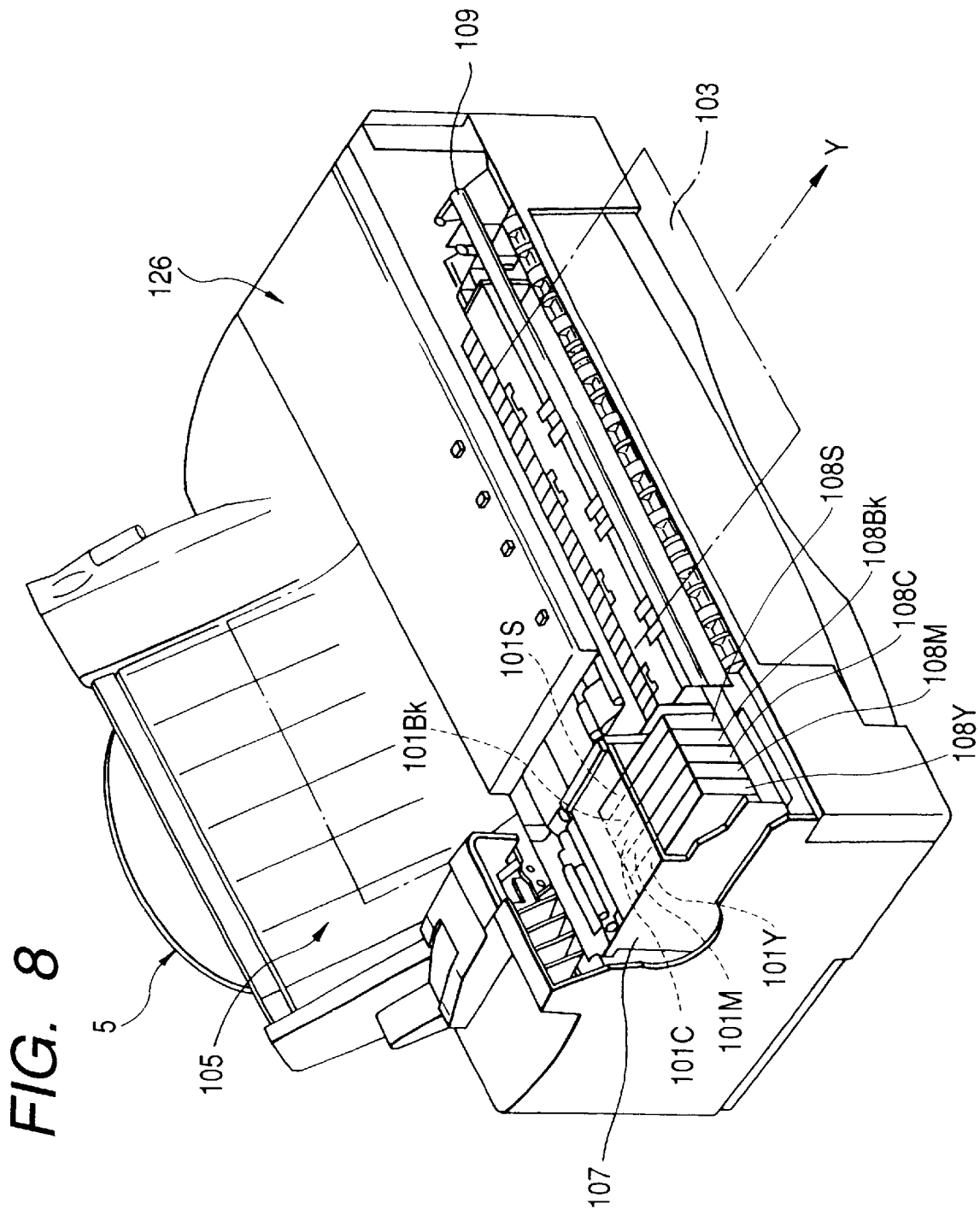
FIG. 8 is a diagonal view showing the configuration of a printing apparatus relevant to an embodiment of the invention.

FIG. 8 is a schematic perspective view illustrating a construction of a serial type printing apparatus 5 to be used in the present invention. It is apparent that not only the full line-type printing apparatus but a serial type printing apparatus can be sued for applying to a recording medium a treating liquid prior to the application of an ink. In FIG. 8, the elements equal to those shown in FIG. 6 are denoted by the same reference numeral as in FIG. 6 and their detailed descriptions are omitted. A recording paper 103, as a recording medium, is inserted into a paper-supplying portion 105 and delivered via a printing portion 126. In this example, plain paper which is cheap and widely used is employed as the recording medium 103. In the printing portion 126, a carriage 107 is constructed to hold print heads 101Bk, 101S, 101C, 101M and 101Y and be able to do a reciprocating motion along a guide rail 109 with the aid of driving force of a motor, which is not shown in the figure. The print head 101Bk is for ejecting a black ink described in the aforementioned embodiment. The print heads 101S, 101Bk, 101C, 101M and 101Y are for ejecting a treating liquid, cyan ink, magenta ink and yellow ink, respectively; and they are driven to eject the liquid or ink to the recording paper 103 in this above order.

Each head is fed with an ink or a treating liquid from each corresponding tank 108C, 108Bk, 108C, 108M or 108Y. When the ink is to be ejected, each electrical heat transducer, that is, according to the driving signal sent to the heater of each ejection port of each head, heat energy is applied to the ink or the treating liquid to generate a bubble. By the pressure of this bubble, the ink or the treating liquid is ejected from its head. Each head includes 64 ejection ports at a density of 360 dpi which are arranged in almost the same direction as the paper 103 conveying direction Y, in other words, in the direction almost perpendicular to the scanning direction of each head. The ejection amount of each ejection port is 25 pl.

In the above construction, the distance between the heads is ½ inch, accordingly the distance between the head 101Bk and the head 101S is 1 inch. The printing density is 720 dpi in the scanning direction and the ejection frequency of each head is 7.2 KHz. Accordingly, the time from the ejection of the treating liquid S from the head 101S to the ejection of the black mix ink from the head 101Bk is 0.05 sec.

EXAMPLE 4

In another form of the examples shown in FIGS. 6 and 8 in which, instead of mixed ink, different inks each containing a first pigment and a second pigment are ejected independently, print heads of a recording head group 101g, a head 101Bk1 for ejecting a first black pigment ink, a head 101Bk2 for ejecting a second black pigment ink, a head 101S for ejecting a treating liquid, and heads for ejecting colored inks (cyan head 101C, magenta head 101M and yellow head 101Y) are arranged in a direction of the conveyance of a recording paper 103 as show in the figures. Black printed letters and color printed images can be obtained by ejecting each colored ink and treating liquid from each ink head.

In this example, for the first black pigment ink and the second black pigment ink ejected from the heads 101Bk1 or 101Bk2, respectively, less penetrating inks with a low penetrating speed were used, and for the treating liquid and the cyan, magenta and yellow inks ejected from the respective heads 101S, 101C, 101M or 101Y, a highly penetrating treating liquid and inks were used.

The compositions of the first and second black pigment inks and the treating liquid used in this example are as follow.

| [Treating liquid] | |
|---|---|
| glycerol | 7 parts |
| diethylene glycol | 5 parts |
| Acetylenol EH | 2 parts |
| (from Kawaken Fine Chemicals Co., Ltd.) | |
| polyallylamine | 4 parts |
| (molecular weight: 1500 or less, average: about 1000) | |
| acetic acid | 4 parts |
| benzalkonium chloride | 0.5 parts |
| triethylene glycol monobutyl ether | 3 parts |
| water | the rest |

| [Black (Bk) First Pigment Ink] | |
|---|---|
| pigment dispersion 1 | 50 parts |
| glycerol | 6 parts |
| diethylene glycol | 5 parts |
| Acetylenol EH | 0.1 parts |
| (from Kawaken Fine Chemicals Co., Ltd.) | |
| water | the rest |

The Ka value of this black ink was 0.33. The above pigment dispersions 1 and 2 are as follows:

| [Black (BK) Second Pigment Ink] | |
|---|---|
| pigment dispersion 2 | 50 parts |
| ethylene glycol | 8 parts |
| glycerol | 5 parts |
| isopropyl alcohol | 4 parts |
| water | the rest |

With the first black pigment ink and the second black pigment ink according to the example of the present invention described above, there is conducted the reaction of the dispersed liquid mixture containing the first pigment, the second pigment and a polymer dispersant, all of which have the same polarity; with a treating liquid containing compounds, which have the opposite polarity to that of the above liquid mixture.

The distance Di between the head 101Bk1 for ejecting the pigment ink and the head 101S for ejecting the treating liquid (see FIG. 9) was 40 mm, accordingly the time interval from the ejection of the treating liquid to the ejection of the black ink Bk1 was about 0.24 sec. The ejection amount of each print head was 15 pl per ejection except that each Bk head ejected about 10 pl per ejection. Accordingly, when producing a pixel using two Bk heads, Bk1 and Bk2, the amount of ink provided per pixel was about 20 pl.

The printed matter obtained using the above apparatus and ink was evaluated in the same manner as in the above examples 1-1 to 1-3. Almost the same results as in the above examples were obtained.

EXAMPLE 5

Figure 9:
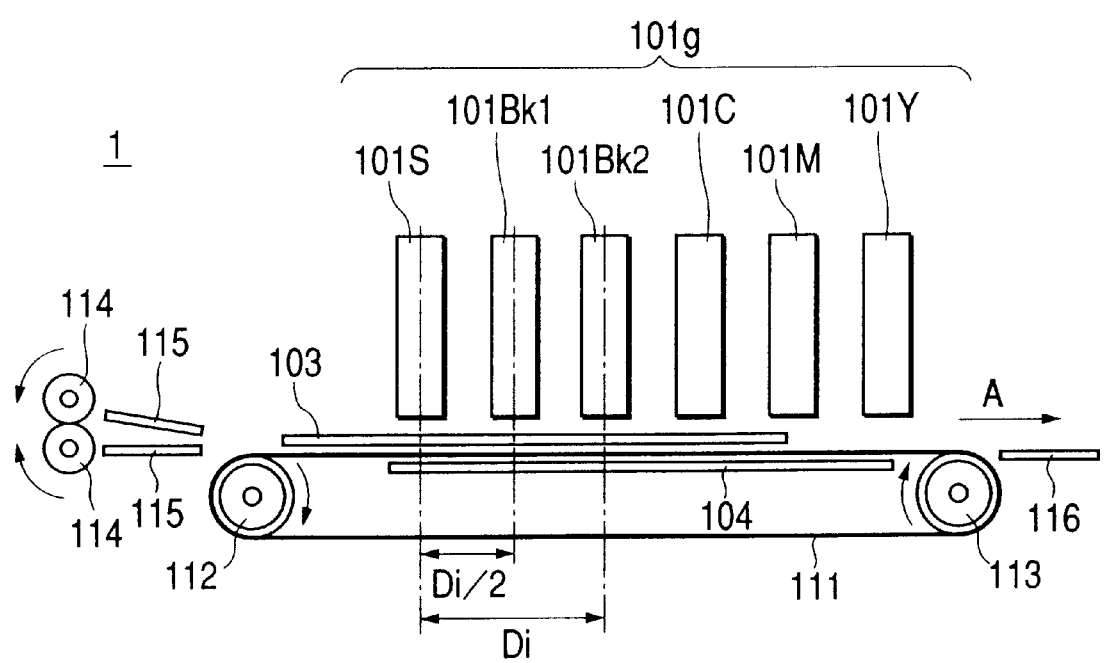
FIG. 9 is a diagonal view showing the configuration of a printing apparatus relevant to another embodiment of the invention.
Figure 10:
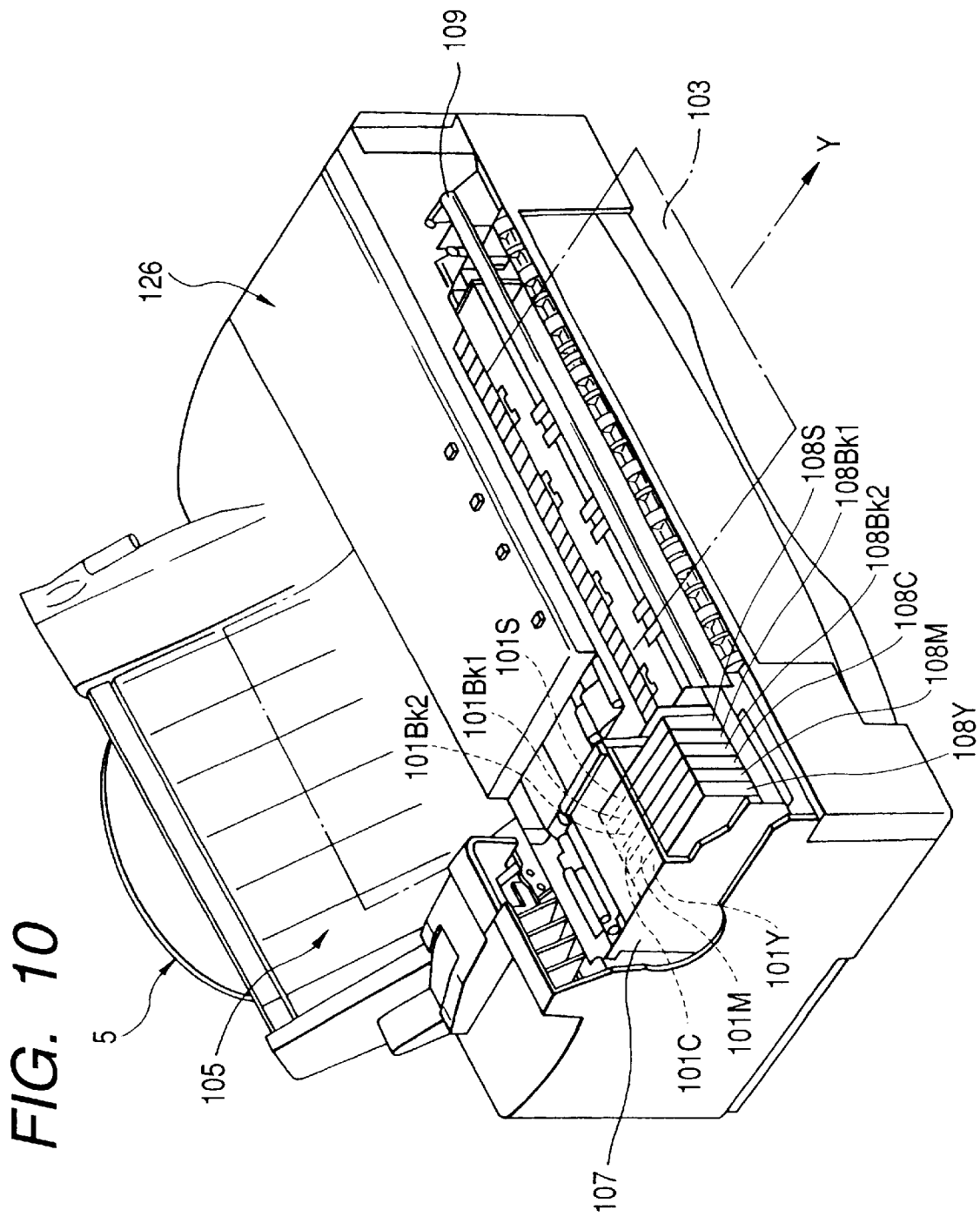
FIG. 10 is a diagonal view showing the configuration of a printing apparatus relevant to still another embodiment of the invention.

Referring to FIG. 10, there is shown a schematic perspective view illustrating a construction of a serial type printing apparatus 5 in which a first pigment ink and a second pigment ink are mixed with each other on a recording medium, subsequently after that, a treating liquid is reacted with the mixed ink. It is apparent that the printing apparatus in which a treating liquid is provided before the above two inks are mixed on a recording medium, so as to react them with each other is applicable not only to the aforementioned full line-type printing apparatus, but also to a serial type printing apparatus. In FIG. 10, the elements equal to those shown in FIG. 9 are denoted by the same reference numeral as in FIG. 9 and their detailed descriptions are omitted.

A recording paper 103, as a recording medium, is inserted into a paper-supplying portion 105 and delivered via a printing portion 126. In this example, plain paper not expensive and commonly and widely used is employed as the recording paper 103. In the printing portion 126, a carriage 107 is constructed to contain print heads 101Bk1, 101Bk2, 101S, 101C, 101M and 101Y and be able to do a reciprocating motion along a guide rail 109 with the aid of driving force of a motor, which is not shown in the figure. The print head 101Bk1 is for ejecting the first black pigment ink and the print head 101Bk2 is for ejecting the second black pigment ink. The print heads 101S, 101C, 101M and 101Y are for ejecting a treating liquid, cyan ink, magenta ink and yellow ink, respectively; and they are driven to eject their respective inks to the recording paper 103 in the above order.

Each head is fed with an ink or a treating liquid from each corresponding tank 108Bk1, 108Bk2, 108S, 108C, 108M or 108Y. When the ink is to be ejected, each electrical heat transducer (heater) provided for each ejection port of each head is fed with a driving signal, so as to apply heat energy to the ink or the treating liquid to allow it to generate bubbles. With the aid of the pressure of these bubbles, the ink or the treating liquid is ejected from its head. Each head includes 64 ejection ports at a density of 360 dpi which are arranged in almost the same direction Y of the conveyance of the recording paper 103, in other words, in the direction almost perpendicular to the scanning direction of each head. The ejection amount of ejection ports for the Bk ink is 15 pl and the ejection amount of ejection ports for the treating liquid and the ink other than the Bk ink is 23 pl.

In the above construction, the distance between the heads is ½ inch, accordingly the distance between the head 101Bk1 and the head 101S is ½ inch. And printing density is 720 dpi in the scanning direction and the ejection frequency of each head is 7.2 KHz. Accordingly, the time from the ejection of the treating liquid from the head 101S to the ejection of the pigment ink from the head 101Bk1 is 0.05 sec.

According to the present invention, images having a high OD, excellent edge sharpness, and less back-through on a recording medium can be obtained by using an ink which contains a first pigment, a second pigment and a polymer dispersant for dispersing the second pigment, and a treating liquid which reactive with the ink, applying the treating liquid and subsequently the ink to the same recording medium in such a manner that the above treating liquid and ink are mixed with each other on the recording medium in a liquid state. In addition, the use of the above process greatly improves the slow fixing rate and insufficient fixing properties of the currently used pigment ink.

Further, according to the present invention, "oozing" or "haze" is very effectively inhibited from occurring around the image dots.

For the treating liquid having a Ka value, according to the Bristow method, of 5.0 (ml/m$^2$·msec$^{1/2}$) or more, its penetrating speed is relatively high, and its use can enhance the fixing rate of the ink.

What is claimed is:

1. An ink-jet printing process including a process of recording images on a recording medium, said process comprising the steps of:
   (i) applying an ink on a recording medium by employing an ink-jet recording process, and
   (ii) applying a treating liquid capable of reacting with the ink;

wherein said ink contains a first pigment and a second pigment dispersed in an aqueous medium, said first pigment being selected from a self-dispersing pigment having at least one anionic group bonded directly or through another atomic group to the surface of the first pigment and a self-dispersing pigment having at least one cationic group bonded directly or through another atomic group to the surface of the first pigment and said second pigment being capable of being dispersed in an aqueous medium by a polymer dispersant, said ink further containing at least one dispersant selected from the group consisting of polymer dispersants having the same polarity as that of the group bonded to the surface of said first pigment and nonionic polymer dispersants, and wherein said step (i) is conducted subsequently to said step (ii) so as to bring said ink and said treating liquid into contact with each other in a liquid state on said recording medium.

2. The ink-jet printing process according to claim 1, wherein said treating liquid has a penetration speed of 5.0 (ml/m²·msc$^{1/2}$) or higher as a Ka value measured by Bristow method.

3. The ink-jet printing process according to claim 1, wherein said ink has a penetration speed of less than 1 (ml/m²·msc$^{1/2}$) as a Ka value measured by Bristow method.

4. The ink-jet printing process according to claim 1, wherein said anionic group is at least one selected from the group consisting of —COOM, —SO$_3$M, —PO$_3$HM and —PO$_3$M$_2$ wherein M independently represents hydrogen atom, an alkali metal, ammonium, or an organic ammonium.

5. The ink-jet printing process according to claim 1, wherein said cationic group is at least one selected from the following:

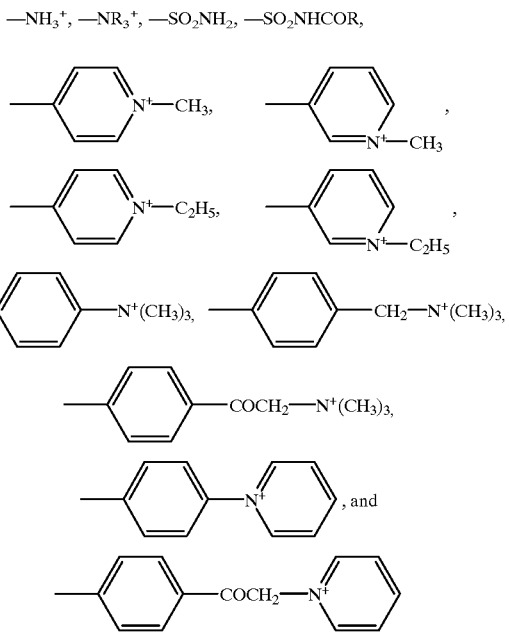

wherein R independently represents a linear branched alkyl group, a substituted or unsubstituted phenyl group, or a substituted or unsubstituted naphthyl group.

6. The ink-jet printing process according to claim 1, wherein said atomic group is selected from the group consisting of an alkyl having 1 to 12 carbon atoms, a phenyl group which may be substituted, and a naphthyl group which may be substituted.

7. The ink-jet printing process according to claim 1, wherein 80% or more particles of said first pigment have a particle diameter of 0.05 to 0.3 μm.

8. The ink-jet printing process according to claim 1, wherein 80% or more particles of said first pigment have a particle diameter of 0.1 to 0.25 μm.

9. The ink-jet printing process according to claim 1, wherein said second pigment is dispersed by adsorbing a polymer dispersant in the surface thereof.

10. The ink-jet printing process according to claim 1, wherein said polymer dispersant is at least one selected from the group consisting of a sulfonic acid type polymer dispersant and a carboxylic acid type polymer dispersant.

11. The ink-jet printing process according to claim 1, wherein said second pigment contains at least two pigments having different structures.

12. The ink-jet printing process according to claim 1, wherein the ratio of said first pigment to said second pigment is within the range from 5/95 to 97/3.

13. The ink-jet printing process according to claim 1, wherein the ratio of said first pigment to said second pigment is within the range from 10/90 to 95/5.

14. The ink-jet printing process according to claim 1, wherein the ratio of said first pigment to said second pigment is within the range from 9/1 to 4/6.

15. The ink-jet printing process according to claim 1, wherein said first pigment is contained at a content higher than that of said second pigment.

16. The ink-jet printing process according to claim 1, wherein at least one of said first pigment and said second pigment is a carbon black.

17. The ink-jet printing process according to claim 1, wherein said ink further contains a dye with the same polarity as that of the group bonded to the surface of said first pigment.

18. The ink-jet printing process according to claim 17, wherein said dye is selected from an anionic dye and a cationic dye.

19. The ink-jet printing process according to claim 18, wherein said anionic dye is at least one selected from the group consisting an acidic dye, a direct dye, and a reactive dye.

20. The ink-jet printing process according to claim 18, wherein said anionic dye has a skeletal structure selected from a disazo skeletal structure and a trisazo skeletal structure.

21. The ink-jet printing process according to claim 1, wherein said treating liquid contains a compound having at least one group with the polarity opposite to that of the group bonded to the surface of said first pigment.

22. The ink-jet printing process according to claim 1, wherein said treating liquid contains a first compound having one group with the polarity opposite to that of the group bonded to the surface of said first pigment and a second compound having a plurality of groups with the polarity opposite to that of the group bonded to the surface of said first pigment.

23. The ink-jet printing process according to claim 22, wherein said first compound is benzalkonium chloride and said second compound is polyallylamine.

24. The ink-jet printing process according to claim 22 or 23, wherein the ratio of said first compound and said second compound in said treating liquid is substantially optimized for the composition of said ink.

25. An ink-jet printing process comprising the steps of:

(i) applying a first ink, (ii) applying a second ink, and (iii) applying a treating liquid reactive with each of said first and second inks in such a manner that the respective first ink, second ink and treating liquid come into contact with each other on the surface of a recording medium in a liquid state, wherein said first ink contains a first pigment selected from a self-dispersing pigment having at least one anionic group bonded directly or through another atomic group to the surface of said first pigment and a self-dispersing pigment having at least one cationic group bonded directly or through another atomic group to the surface of the first pigment, said second ink contains a dispersant and a second pigment capable of being dispersed in an aqueous medium by the polymer dispersant, the dispersant being at least one selected from a nonionic polymer dispersant and a polymer dispersant having the same polarity as that of the group bonded to the surface of the self-dispersing pigment, said treating liquid containing a compound having a polarity opposite to the group bonded to the surface of the self-dispersing pigment, and the step (iii) is carried out before the steps (i) and (ii).

* * * * *

UNITED STATES PATENT AND TRADEMARK OFFICE
CERTIFICATE OF CORRECTION

PATENT NO. : 6,527,385 B2  Page 1 of 1
DATED : March 4, 2003
INVENTOR(S) : Noribumi Koitabashi et al.

It is certified that error appears in the above-identified patent and that said Letters Patent is hereby corrected as shown below:

Column 2,
Line 9, "cause" should read -- cause the --.

Column 3,
Line 22, "has" should read -- have --.

Column 4,
Line 36, "the these" should read -- these --.

Column 7,
Line 4, "organic ammonium." should read -- organic ammonium). --

Column 24,
Line 54, "show" should read -- shown --.

Column 27,
Line 29, "—$PO_3M_2$" should read -- $PO_3M_2$, --.

Signed and Sealed this

Twenty-eighth Day of October, 2003

JAMES E. ROGAN
*Director of the United States Patent and Trademark Office*